US007927412B2

(12) United States Patent
Kuriyama et al.

(10) Patent No.: US 7,927,412 B2
(45) Date of Patent: Apr. 19, 2011

(54) PIGMENT INK COMPOSITION AND COATING MATERIAL

(75) Inventors: Akira Kuriyama, Atsugi (JP); Takayuki Teshima, Yokohama (JP); Kazumichi Nakahama, Tokyo (JP); Rie Ueno, Hadano (JP); Masatoshi Watanabe, Isehara (JP); Takeo Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/175,098

(22) Filed: Jul. 17, 2008

(65) Prior Publication Data
US 2009/0025603 A1   Jan. 29, 2009

(30) Foreign Application Priority Data

Jul. 25, 2007   (JP) .................................. 2007-193904

(51) Int. Cl.
*C09D 11/00*   (2006.01)
*C09D 11/02*   (2006.01)
(52) U.S. Cl. .................................................. 106/31.65
(58) Field of Classification Search ............... 106/31.65, 106/31.6
See application file for complete search history.

(56) References Cited

U.S. PATENT DOCUMENTS

| 3,862,297 | A  | * | 1/1975  | Claridge et al. | 423/615 |
| 5,320,781 | A  | * | 6/1994  | Stahlecker et al. | 252/518.1 |
| 5,837,045 | A  |   | 11/1998 | Johnson et al. | 106/31.85 |
| 6,406,528 | B1 | * | 6/2002  | Macholdt et al. | 106/31.49 |
| 6,499,839 | B1 | * | 12/2002 | Busby et al. | 347/96 |
| 6,537,364 | B2 | * | 3/2003  | Dietz et al. | 106/493 |
| 6,589,396 | B2 |   | 7/2003  | Kuriyama et al. | 204/157.15 |
| 6,776,886 | B2 |   | 8/2004  | Kuriyama et al. | 204/261 |
| 6,902,613 | B2 | * | 6/2005  | Babler | 106/493 |
| 7,211,139 | B2 | * | 5/2007  | Robertson et al. | 106/497 |
| 7,427,323 | B1 | * | 9/2008  | Birau et al. | 106/497 |
| 7,503,973 | B1 | * | 3/2009  | Carlini | 106/496 |
| 2006/0057485 | A1 |   | 3/2006  | Teshima et al. | 430/108.8 |

(Continued)

FOREIGN PATENT DOCUMENTS

JP   10-251533   9/1998

(Continued)

OTHER PUBLICATIONS

Yoshinari Taguchi, et al., "Effect of Addition of Aqueous Stabilizer in the Preparation of Composite Particles by Suspension Polymerization," Shikizai Kyokaishi, vol. 70, No. 8 (1997), pp. 503-508.

(Continued)

*Primary Examiner* — Helene Klemanski
(74) *Attorney, Agent, or Firm* — Fitzpatrick, Cella, Harper & Scinto

(57) ABSTRACT

A pigment ink composition has high transparency and good color characteristics such as a high OD that are not inferior to those of dyes, even though pigment particles are used, and also has good weatherability and remaining ability on the coating and printing medium surface that are inherent to pigment particles. The pigment ink composition contains pigment particles including at least needle pigment particles, a dispersant, and a solvent. The needle pigment particles have a needle shape with an aspect ratio of at least 3, an average aspect ratio of at least 5 and at most 7, an average short dimension of at least 20 nm and at most 30 nm, and a distribution of short dimension with a standard deviation of 2.0 nm or less. The needle pigment particles are covered with the dispersant.

12 Claims, 11 Drawing Sheets

U.S. PATENT DOCUMENTS

| | | |
|---|---|---|
| 2007/0119336 A1 | 5/2007 | Nakahama et al. .......... 106/31.6 |
| 2007/0149651 A1 | 6/2007 | Teshima et al. ............... 523/315 |
| 2007/0172589 A1 | 7/2007 | Teshima et al. ............... 427/212 |
| 2007/0215270 A1 | 9/2007 | Nakahama et al. ........... 156/238 |
| 2007/0283847 A1 | 12/2007 | Nakahama et al. ........ 106/31.85 |
| 2007/0285458 A1 | 12/2007 | Nakahama et al. ............. 347/20 |
| 2008/0087336 A1 | 4/2008 | Yasuda et al. ............. 137/561 R |
| 2008/0268250 A1* | 10/2008 | Hawkett et al. ............... 428/407 |

FOREIGN PATENT DOCUMENTS

| | | |
|---|---|---|
| JP | 2003-128961 | 5/2003 |
| JP | 2003-138177 | 5/2003 |
| JP | 2004-137487 | 5/2004 |
| WO | WO 97/48769 | 12/1997 |
| WO | WO 2007/077962 A1 | 7/2007 |

* cited by examiner

102 NEEDLE PIGMENT PARTICLES

101 ALUMINA PARTICLES

103 SPHERICAL PIGMENT PARTICLES

F I G. 5A
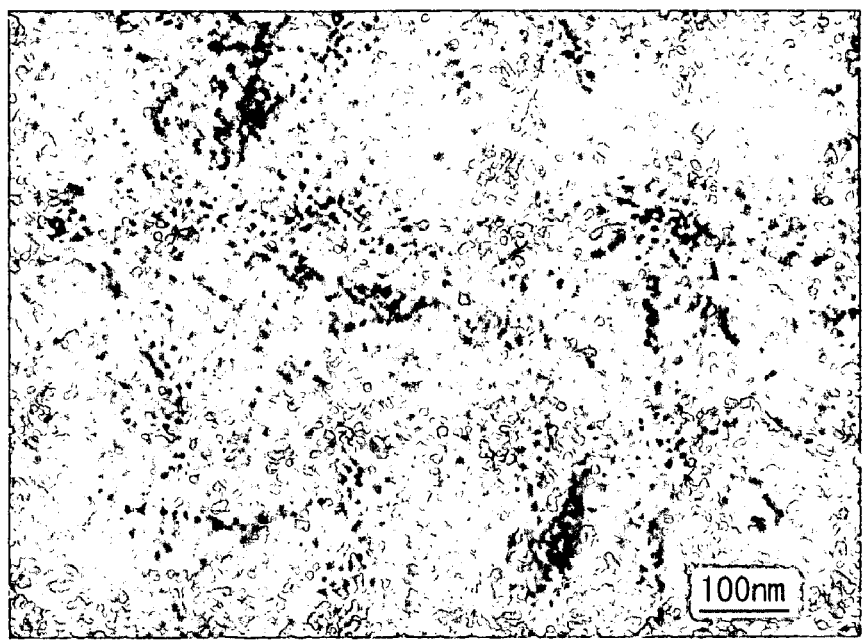
F I G. 5B
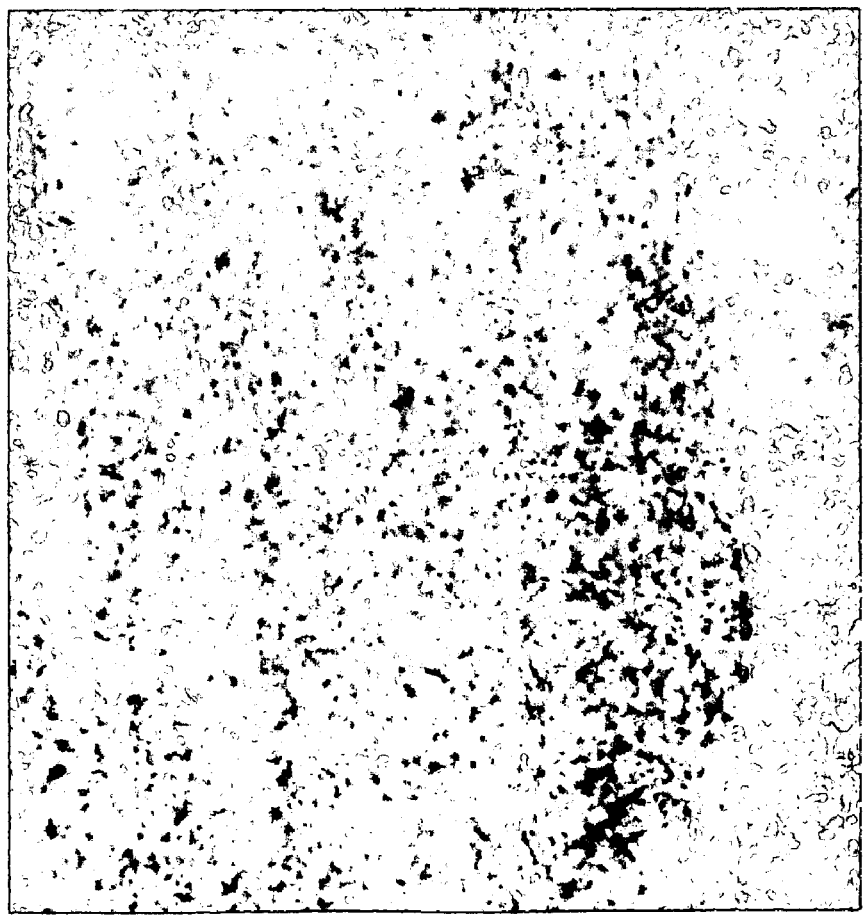

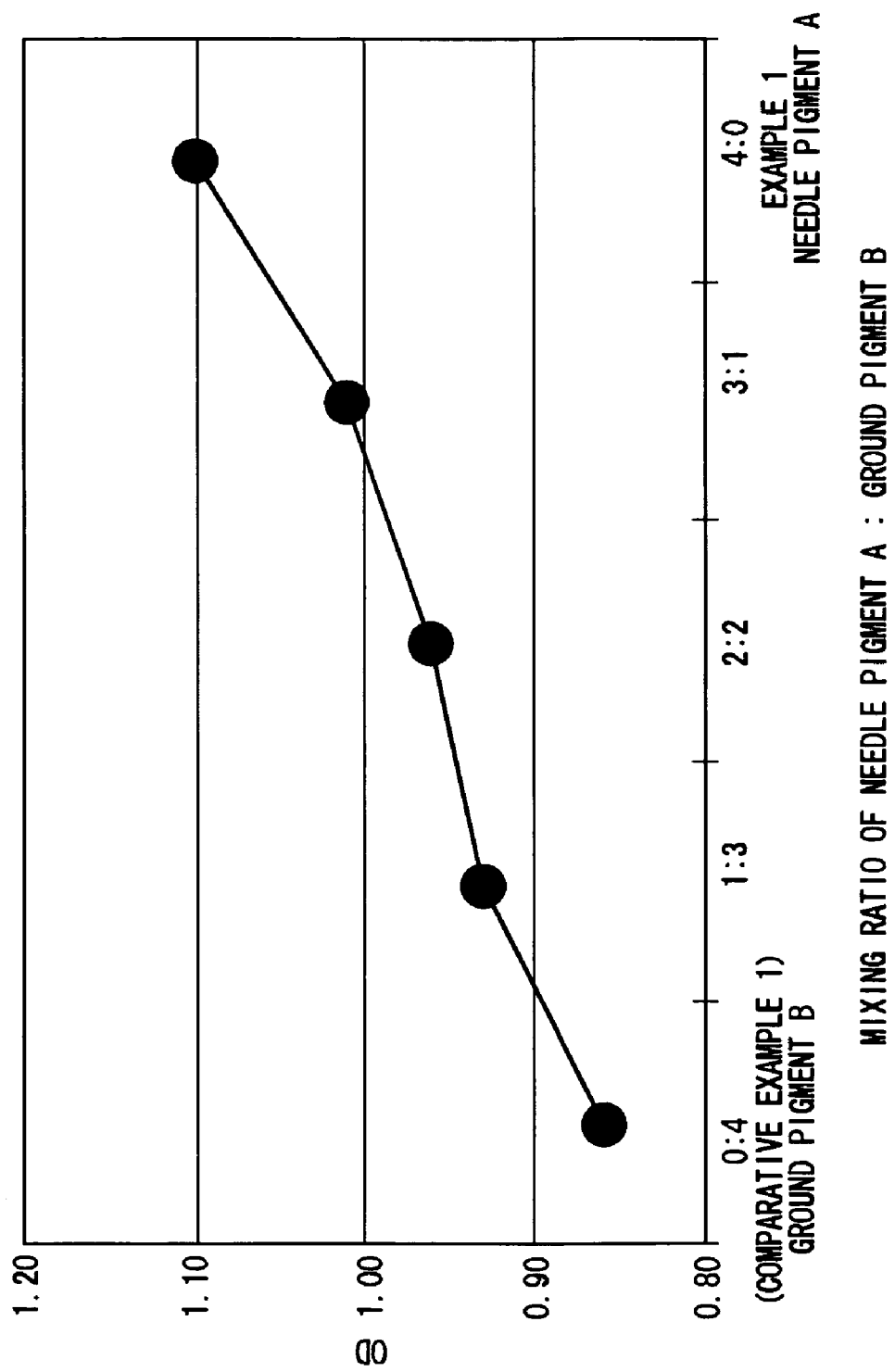

PIGMENT INK COMPOSITION AND COATING MATERIAL

BACKGROUND OF THE INVENTION

Field of the Invention

The present invention relates to a pigment ink composition and coating material.

Dyes and pigments are known as colorants introduced into inks and the like.

The advantage of dyes is that they are dissolved in solvents and form single molecules or molecular clusters, thereby ensuring a sharp absorption spectrum and good coloring ability.

On the other hand, dyes are dissolved in liquids in a molecular state and are present on the medium (printing medium such as paper) surface or inside thereof after coating or printing. The resultant drawback is that the molecules are decomposed under the effect of light and chemical substances with high activity such as ozone, thereby decreasing OD (Optical Density, also referred to as reflection density).

As a result, although good coloration is observed immediately after a dye colorant is coated or printed, the color fades with time and weatherability is poor. Further, when coating or printing is performed on a permeable medium such as paper, the dye permeates together with solvent deep into the medium. The resultant problem is that part of the coated/printed dye does not participate in surface coloration and causes offset.

On the other hand, pigments are dispersed in a liquid as pigment particles, rather than in a molecular state, and pigment particles or aggregates thereof are present on the coated/printed surface. As a result, because pigments have high resistance to light and highly active chemical substances such as ozone, they demonstrate excellent weatherability after coating and printing even when used in a state of liquid ink.

Because the pigment particles are fixed to the surface layer of the coated or printed surface, no pigment is lost and offset is practically not a problem. However, because pigments are in the form of particles, a problem associated therewith is that light is easily scattered thereon and color characteristics such as feel of transparency, feel of gloss, and coloration ability are inferior to those attained with dyes. For this reason, the applications of pigments are limited.

In order to resolve this problem and obtain color characteristics closer to those obtained with dyes, an attempt has been made to develop pigment particles with a smaller particle size. However, the dispersivity of pigment particles typically degrades and the viscosity of dispersion increases as the particle size decreases, causing the occurrence of color unevenness and degradation of operability in a coating process when pigments are used for coating. Other adverse effects include a decrease in landing accuracy, a decrease in uniformity of ink droplets, and clogging of nozzles or the like occurring when pigments are used in inks for ink-jet printers.

In order to resolve this problem, a method has been investigated by which particles are dispersed without a dispersant, as described in International Publication WO97/48769. A method for covering the pigment surface with a compound having dispersivity by adsorbing a dispersant monomer on the pigment particle surface and polymerizing the monomer (such pigment is called "dispersant-covered pigment") has also been investigated, as described in Shikizai Kyokaishi, 70, 503 (1997).

Japanese Patent Laid-open No. 2003-128961 describes the shape of such pigment particles having dispersion ability.

According to the description of Japanese Patent Laid-open No. 2003-128961, a pigment with a number ratio of 20% or more of particles with a primary particle diameter of less than 50 nm and a primary particle aspect ratio (ratio of long diameter, or length dimension, to short diameter, or width dimension, in primary particles) from 1 to 3 excels in gloss, light resistance, and color reproducibility.

However, there is no description relating to weatherability. Furthermore, it is described that by setting the needle shape ratio to a specific value, that is, a value closer to that of a spherical shape, it is possible to obtain fine particles with uniform characteristics, and that spherical particle shape is more effective.

Japanese Patent Laid-Open No. 10-251533 describes pigment particles with a short diameter of 0.02 to 0.5 μm and an aspect ratio of 1 to 5. This document discloses a process such that where a pigment dispersant is present during crystal growth, the dispersant is adsorbed on a new active surface and inhibits crystal growth, thereby preventing the particles from growing to a very large aspect ratio.

Likewise, Japanese Patent Laid-Open No. 2004-137487 discloses pigment particles with an aspect ratio of 8.0 to 16.5 that make it possible to obtain a colored coating film with excellent gloss.

Further, Japanese Patent Laid-Open No. 2003-138177 discloses a method for obtaining pigment particles of a size smaller than that of the conventional particles by varying the grinding treatment time when pigment particles are produced by physical grinding. This document also discloses that image quality and abrasion resistance are improved when ink for an ink-jet printer is produced by mixing such pigment particles with the pigment particles of conventional size.

However, several problems remain associated with the above-described methods.

Even when a pigment is imparted with dispersion ability or coated with a dispersant, a risk of aggregation due to the presence in ink and increase in viscosity of the ink itself are impossible to avoid with the particles that are much smaller than the conventional particles. As a result, compositions contained in the ink tend to precipitate, thereby degrading the ink quality, during storage in the production process or thereafter or during transportation, e.g. with ships, causing problems such as clogging of nozzles when the ink is printed with an ink-jet printer.

In order to resolve this problem, the content ratio of components present on the pigment particle surface that contribute to the dispersion ability may be further increased to improve dispersivity of the particles in ink, but the weight ratio of colorant in the entire particle is thereby reduced, the color characteristic is degraded, and the decrease in the pigment particle size becomes meaningless.

Further, in the case of diameters of primary particles or secondary particles formed by aggregation of primary particles exceeding 100 nm, most pigment particles have a spherical shape which minimizes the surface area of the pigment in liquid. As a result, serious problems are rarely associated with particle shape. However, as pigment particles are reduced in size, the ratio of pigment particles shaped as a rugby ball or needle where the long diameter and short diameter differ from each other (in other words, the aspect ratio is much larger than 1) increases.

Spherical particles (low aspect ratio) are generally considered to be superior to needle particles (high aspect ratio) in terms of color characteristics. When coating or printing is performed on a printing medium, the spherical shape of pigment particles easily produces surface concavities and concavities of small size. The problems associated with color characteristics are more serious when the spread of particle shape is large and the length or aspect ratio distribution has a large range, even if a pigment of small particle size is employed.

Further, spherical particles are also thought to be superior in terms of particle dispersivity, viscosity, and prevention of clogging. Needle pigment particles aggregate more easily since they have a contact area larger than spherical pigment particles. Where the aspect ratio of pigment particles is too high, the contact area increases between the particles or between the particles and the wall surface of the ink-jet nozzle or the like, thereby facilitating the aggregation of pigment particles, raising viscosity, and increasing the probability of nozzle clogging.

Thus, in order to improve color characteristics of pigment inks and minimize the decrease in quality, it is necessary not only to reduce the size of pigment particles as a composition, but also pay attention to the particle shape and spread thereof and perform control that optimizes the particle shape.

With the foregoing in view, the present invention can provide a pigment ink composition that has high transparency and color characteristics, such as OD, that are not inferior to those of dyes, and demonstrates good weatherability and remaining ability on the coating and printing medium surface that are inherent to pigment particles.

The present invention provides an ink for an ink-jet printer that uses the aforementioned pigment ink composition and prevents clogging of the nozzle.

The present invention provides a coating material that uses the aforementioned pigment ink composition and prevents the increase in viscosity that degrades operability.

SUMMARY OF THE INVENTION

The pigment ink composition provided by the present invention comprises pigment particles including needle pigment particles, a dispersant, and a solvent, wherein the needle pigment particles have a needle shape with an aspect ratio of at least 3, an average aspect ratio of at least 5 and at most 7, an average short diameter of at least 20 nm and at most 30 nm, and a distribution of short diameter with a standard deviation of 2.0 nm or less, and the needle pigment particles are covered with the dispersant.

An ink for an ink-jet printer that resolves the above-described problems is composed of the above-described pigment ink composition.

A coating material that resolves the above-described problems is composed of the above-described pigment ink composition.

The present invention can provide a pigment ink composition that has high transparency and color characteristics, such as OD, that are not inferior to those of dyes, even though pigment particles are used, and demonstrates good weatherability and remaining ability on the coating and printing medium surface that are inherent to pigment particles.

Further, the present invention can provide an ink for an ink-jet printer that uses the aforementioned pigment ink composition and prevents clogging of the nozzle.

The present invention can also provide a coating material that uses the aforementioned pigment ink composition and prevents the increase in viscosity that degrades operability.

Further features of the present invention will become apparent from the following description of exemplary embodiments (with reference to the attached drawings).

BRIEF DESCRIPTION OF THE DRAWINGS

FIG. 5A is a TEM photograph obtained by observing the pigment particles of Example 1 of the present invention;

FIG. 5B is a TEM photograph obtained by observing the pigment particles of Example 1 of the present invention;

FIG. 11 shows OD obtained by printing inks of Example 1 of the present invention, Comparative Example 1, and Example 3 on the usual paper.

DESCRIPTION OF THE EMBODIMENTS

Figure 1A:
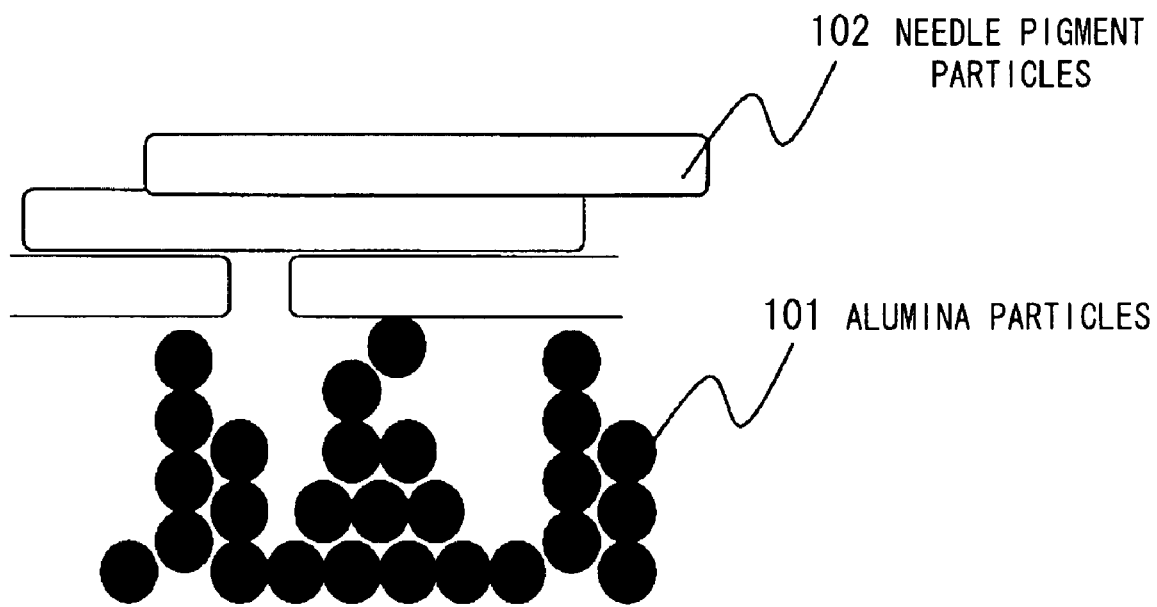
FIG. 1A and FIG. 1B are schematic drawings illustrating a state in which pigment particles form an ink layer on an ink absorption layer of glossy paper.

The present invention will be described below in greater detail.

The inventors have produced a coating material and an ink comprising a composition in which needle pigment particles having an aspect ratio within a certain range and a uniform small diameter are coated with a dispersant and have obtained the following information.

1. Transparency and color performance such as OD that are not inferior to that of dyes are demonstrated.
2. Weatherability and remaining ability are maintained.
3. Degradation of dispersion ability of the pigment (deterioration of quality, increase in viscosity, and clogging of nozzles caused thereby) is minimized.

It has also been established that image quality improvement can be expected even in the case when the needle pigment particles are mixed with pigment particles manufactured by physical grinding.

The present invention is based on these novel findings.

The present invention provides a pigment ink composition that demonstrates high transparency and high OD, has good weatherability, exhibits good remaining ability on the medium surface, makes it possible to expect high coloring ability even with a small amount of pigment, maintains the merits of pigments with high resistance to offset, demonstrates high resistance to aggregation, and causes no degradation of operability or clogging of nozzles.

Thus the pigment ink composition in accordance with the present invention comprises pigment particles including at least needle pigment particles, a dispersant, and a solvent, wherein the needle pigment particles have a needle shape with an aspect ratio of at least 3, an average aspect ratio of at least 5 and at most 7, an average short diameter of at least 20 nm and at most 30 nm, and a distribution of short diameter with a standard deviation of 2.0 nm or less, and the needle pigment particles are covered with the dispersant.

The number ratio of the needle pigment particles in the pigment particles is preferably equal to or more than 50%.

The needle pigment particles are preferably composed of pigment single crystals.

The pigment constituting the needle pigment particles is preferably a polycyclic organic pigment.

The polycyclic organic pigment is preferably a quinacridone compound.

The dispersant that covers the needle pigment particles is preferably a surfactant having polarity.

The pigment ink composition in accordance with the present invention is obtained by mixing a pigment ink composition comprising pigment particles obtained by physical grinding and the above-described pigment ink composition that comprises needle pigment particles obtained by re-precipitation from a solution in which a pigment has been dissolved.

The ink for an ink-jet printer in accordance with the present invention comprises the above-described pigment ink composition.

The coating material in accordance with the present invention comprises the above-described pigment ink composition.

As described above, the smaller the size of pigment particles contained in the pigment ink composition in accordance with the present invention, the more the color characteristics resemble those of dyes, but weatherability and residual property on the surface of a coating or recording medium, which are pigment merits, degrade.

A needle-like shape in which the short diameter is reduced (shape with a certain aspect ratio) is the shape that satisfies these mutually exclusive requirements.

The reasons why needle pigment particles excel as a colorant will be described below in greater details.

First, transparency of ink having needle pigment particles dispersed therein will be explained. Transparency of a solution is known to be decreased by scattering and reflection of light by particles dispersed in the solution and floating thereupon.

Dye inks in which a colorant is dispersed in a liquid at a molecular level that is much smaller than the light wavelength or fine pigment inks with a pigment particle size of several tens of nanometer are beautiful semitransparent liquids.

On the other hand, pigment inks with a particle size of 100 nm or more, which is close to the light wavelength, look like turbid liquids with low transparency when dispersed.

Consider the size of a shade produced by a particle in the case where a needle pigment particle with a long diameter b floats in a liquid, freely rotating about three axes, xyz, and the liquid is irradiated with light parallel to the z axis.

Rotation of the particle about xy axes produces no special effect on the shadow size, but where the particle rotates through $\theta$ about the z axis, the shadow length becomes $\cos \theta$, b. For example, where $\theta=0$ degrees, 180 degrees, the shadow length is the particle length b, but when $\theta=90$ degrees, 270 degrees, the shadow length is 0 (actually, it is equal to the short diameter).

Thus, the mean particle size determined by taking the rotation about z axis into account is less than b and approaches the value of the short diameter. Because the shadow size is proportional to the amount of reflected light, it is clear that scattering and reflection of light by needle pigment particles is essentially identical to scattering and reflection by spherical pigment particles with a diameter close to the short diameter.

Thus, by using needle pigment particles it is possible to obtain an ink having transparency close to that of the ink having dispersed therein spherical pigment particles with a diameter equal to the short diameter of the needle pigment particles.

Second, the improvement of color characteristics caused by the modification of concavities and convexities on the outermost surface of ink layer will be explained.

FIG. 1 is a schematic drawing illustrating a state in which pigment particles form an ink layer on an ink absorption layer of glossy paper.

Figure 1B:
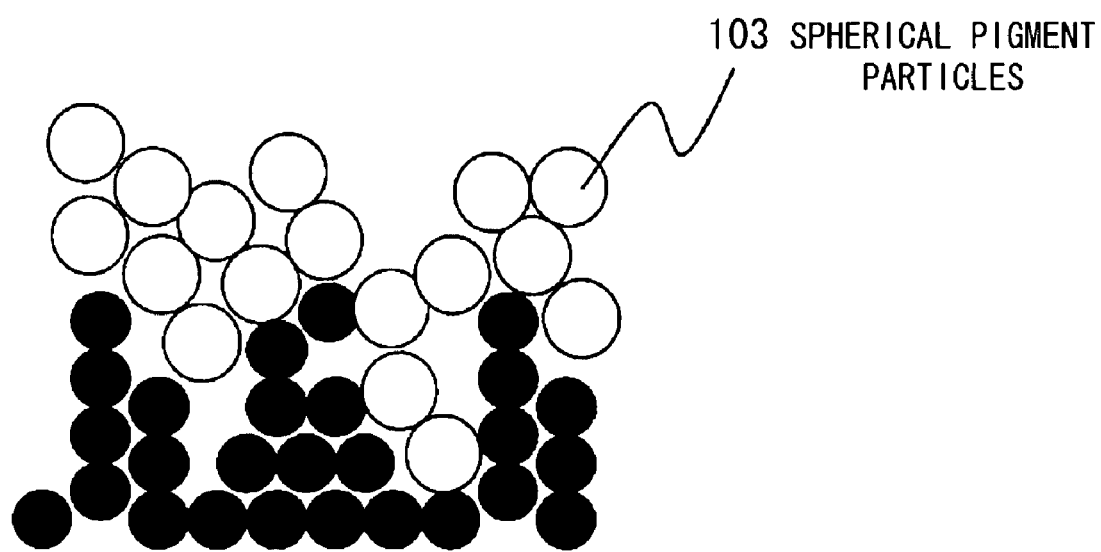

FIG. 1A is a cross-sectional view illustrating schematically a state in which alumina particles 101 and needle pigment particles 102 with a short diameter equal to the diameter of alumina particles form an ink layer on the surface of glossy paper (Professional Photopaper PR-101, manufactured by Canon Inc.) having an alumina particle layer with a particle size of about 30 nm as an ink absorbing material. FIG. 1B shows schematically a cross section relating to the case in which the ink layer is formed by spherical pigment particles 103 of the same particle size as the alumina particles.

When the gloss paper surface is observed under an atomic force microscope (AFM), concavities and convexities of a size several times that of alumina particles are observed.

Figures 2A, 2B:
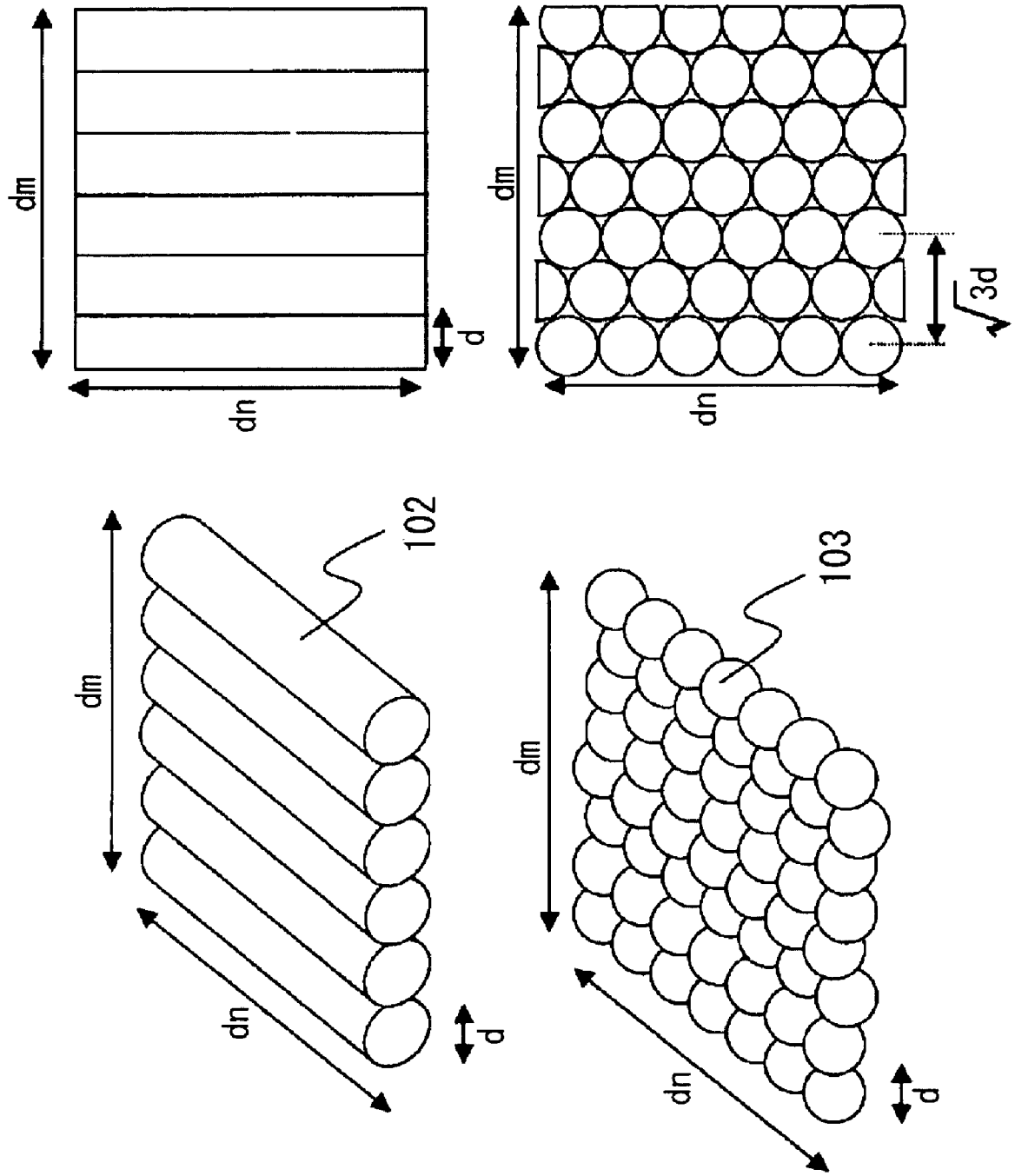
FIG. 2A and FIG. 2B are schematic drawings illustrating a state in which pigment particles are perfectly arranged on a plane.

If the concave portions are fully filled with the particles, the concavities and convexities of the outermost surface will be almost identical in both cases, provided that no special external force is applied that causes intense aggregation of the particles and orients the needle pigment particles in the vertical direction. It is possible that the outermost surface of the ink layer formed by spherical pigment particles will reflect the concavities and convexities of the alumina layer. On the other hand, on the outermost surface of the ink layer formed by needle pigment particles, the needle pigment particles can bridge the concave portions of alumina particles, thereby decreasing the size of concavities and convexities of the outermost layer.

Where needle pigment particles and spherical pigment particles are orderly arranged on a perfect plane, the configurations shown in FIG. 2A and FIG. 2B are obtained, but even in this case, the needle pigment particles are superior in terms of concavities and convexities of the outermost surface of ink layer.

Thus, it can be theoretically explained why, by using needle pigment particles, it is possible to obtain the flatness of the outermost surface of the ink layer that is equal to or better than that obtained with spherical pigment particles with a size equal to the short diameter of the needle pigment particles, and a contribution can be made to the improvement of color characteristics such as OD.

Third, the improvement of color characteristics attained because the needle pigment particle enable high-density filling with a pigment will be explained. Where the short diameter of needle pigment particles is equal to the particle diameter of spherical pigment particles and particles of the two types are perfectly spread, the filling ratio of the needle pigment particles will be higher.

When the particles are coated or printed on a printing medium, the needle pigment particles provide for a higher filling density and improve the OD. Further, because of high density, the ink layer thickness can be decreased and resistance of the coated and printed surface to deterioration caused by powdering and peeling of the ink layer or the like is improved.

The increase in OD caused by an increase in density reduces the amount of pigment necessary to obtain the given OD, thereby reducing running costs required to obtain the coated printed surface of the same quality.

Such an effect can be also expected in a polycrystalline state in which several single crystals are combined in one needle pigment particle, and the maximum effect is demonstrated when all the molecules of one particle are orderly arranged in the same direction and a defect-free single crystal is obtained.

Thus, it can be theoretically explained why, by using needle pigment particles, it is possible to realize a pigment density that is equal to or better than that obtained with spherical pigment particles with a size equal to the short diameter of the needle pigment particles, and a contribution can be made to the improvement of color characteristics such as OD.

Fourth, the advantage of needle pigment particles in terms of weatherability will be explained.

FIG. 2 is a schematic drawing illustrating a state in which pigment particles are perfectly arranged on a plane.

Consider a case in which the short diameter of needle pigment particles is taken to be equal to the size of spherical pigment particles, d, the aspect ratio of needle pigment particles is taken as n (that is, the long diameter is dn), and particles of two kinds are perfectly arranged on a plane with a length dn and a width dm such as shown in FIG. 2 (in FIG. 2, the plane is drawn with n=m=6).

In the case of needle pigment particles, the outermost surface is formed by cylinders cut in half along the axial direction and arranged side by side, whereas in the case of spherical pigment particles, hemispheres are arranged in a zigzag manner.

Calculating the surface area of the upper portion of the two configurations under an assumption of identical projection area, as shown in FIG. 2, the result is $\frac{1}{2}$, $\pi d^2$ nm in the case of needle pigment particles and $1/\sqrt{3}$, $\pi d^2$ nm in the case of spherical pigment particles. Thus, the surface of spherical pigment particles is larger by a factor of about 1.2.

The number of pigment molecules directly exposed to light or active gases of external atmosphere is also larger by a factor of about 1.2 in the case of spherical pigment particles. Actually, the adjacent needle pigment particles are in linear contact with each other, and the external active gases hardly penetrate inside. On the other hand, spherical pigment particles are in point contact. Therefore, gaps are present therebetween and active gases can easily penetrate to a large depth. Accordingly, the difference in the exposed area between the two configurations is further increased. In other words, needle pigment particles produce positive effect on weatherability of coated and printed surface.

Thus, it can be theoretically explained why, by using needle pigment particles, it is possible to realize the surface area of the outermost surface of the printed matter that is less than that obtained with spherical pigment particles of a size equal to the short diameter of needle pigment particles, thereby making it possible to demonstrate weatherability such as light resistance and gas resistance equal to that of spherical pigment particles of a larger particle size.

Fifth, the advantage of needle pigment particles in terms of remaining ability on the coating printing medium surface will be explained.

When a coating or printing medium surface is porous, fibrous, or of particulate shape and the ink solvent is absorbed into the printing medium, the colorant dissolved in a solvent as in the dyes or fine pigment particles are also adsorbed together with the ink solvent into the printing medium. As a result, they are transferred from the initially coated or printed zone.

When the transfer direction is toward the depth (rear side) of the printing medium, the relative amount of colorant remaining on the surface decreases, the OD as a whole decreases, and offset is induced in which the colorant effect is observed even on the rear surface of the printing medium.

Further, when the transfer direction is in a two-dimensional plane direction of the printed medium surface, the boundaries between coated or printed zones and those that are not coated or printed are blurred.

However, it is clear that when the particles have a predetermined aspect ratio, the remaining ability, that is, the inability to penetrate into the gaps of the printing medium, becomes substantially close to that of spherical pigment particles with a size close to the long diameter of the needle pigment particles.

When the gaps in the ink absorption layer of the printing medium surface are less than the size of pigment particles, as in the glossy paper shown in FIG. 1, the problem of remaining ability is not that serious. However, in the case of usual paper in which usual cellulose fibers are intertwined, the gaps between the fibers are of a micron order. As a result, the problem of remaining ability becomes important.

Furthermore, in the case of a fibrous medium, needle pigment particles adhere more easily than spherical pigment particles because the contact surface area of needle pigment particles is larger. This is one more advantage of needle pigment particles.

Thus, it can be explained why, when needle pigment particles are used, the remaining ability is better than that attained with spherical pigment particles with a size equal to the short diameter of needle pigment particles and, therefore, ink can be realized with low levels of blurring and offset that are attained with spherical pigment particles of a larger size.

Sixth, the advantage of needle pigment particles with respect to non-uniformity of hydrophility/hydrophobity of coated or printed medium surface will be explained.

Inks that are typically printed on paper are aqueous. This is because the surface of cellulose fibers constituting the paper is hydrophilic. Glossy paper for ink-jet printers or paper for photographic images is provided with an aqueous ink receiving layer on the surface thereof.

When ink is coated or printed on the entire paper surface, where the pigment uniformly adheres to the paper surface, the pigment can demonstrate the performance of a colorant inherent thereto. However, it is impossible to say whether the aqueous ink receiving layer of the glossy paper surface is always uniform.

Further, in the usual paper or recycled paper, cellulose fibers are intertwined, and it can be easily imagined that the paper surface does not have uniform water absorbing ability.

When paper is produced from pulp, a hydrophobic compound (called "sizing agent") is added to inhibit somewhat the hydrophility of paper and suppress blurring and moisture absorbing ability of ink. However, the sizing agent does not necessarily adhere in the same amount to the cellulose fiber surface and constant hydrophility of fiber surface is not always attained.

This phenomenon becomes even more pronounced when the past history or shape of cellulose fibers serving as a starting material is not uniform, as in the manufacture of recycled paper. Further, in addition to cellulose fibers, the pulp suspension serving as a starting material for paper also contains hydrophobic particle aggregates derived from segments of the so-called wood cellular texture with a high lignin content and a size of about several tens to several hundreds of micrometers.

Further, when the starting material of pulp suspension is recycled paper, foreign matter can be admixed to the paper, such as small residues of water-repellent/water-resistant materials admixed when paper coated on the surface with water-repellent/water-resistant materials, as in the case of milk packages, is recycled into the pulp.

These materials are well known to be included in the manufactured paper, thereby creating the nonuniform surface of usual paper or recycled paper.

Thus, the surface of coating and printing medium is most often nonuniform in terms of hydrophility and hydrophobity.

For this reason, when an aqueous ink comprising a typical pigment is coated, the pigment hardly remains on the hydrophobic sections of the medium surface, and after the ink has dried, these sections remain blank, causing decrease in image quality.

This result can be explained as follows. A typical pigment is in the form of spherical pigment particles with an aspect ratio of less than 3. Therefore, when such pigment is placed on hydrophobic/water-repellent zones, it is repelled together with water, which is the main component of ink. Therefore, the concentration of colorant in the hydrophobic/water-repellent zones decreases and areas with dark and light color (color unevenness) appear on the printed surface.

By contrast, where the particles have a predetermined aspect ratio, the surface area of particles is larger than that in the case of spherical particles. Therefore, when the density of particles is high, the particles adhere and bond to each other, and when the density is low, the particles bond to form a grid-like configuration, thereby easily forming an integrated ink layer and remaining on the surface.

Therefore, the decrease in colorant concentration in the hydrophobic/water-repellent zones can be suppressed, the degree of unevenness in the case that the entire printed surface is viewed is small, and image quality is hardly degraded. This phenomenon seems to be more pronounced as the shape uniformity of needle pigment particles increases.

When needle pigment particles are used, the remaining ability thereof on the surface of hydrophobic/water-repellent zones is higher than that of spherical pigment particles. This is apparently why the occurrence of color unevenness on the surface of a printed medium surface where the surface hydrophility/hydrophobity is not always uniform can be suppressed and colorant performance inherent to the pigment can be fully demonstrated.

The inventors have discovered that by using pigment particles of a needle shape, it is possible to obtain color characteristics identical to those obtained with spherical pigment particles of a size equal to the short diameter of needle pigment particles. At the same time, weatherability and remaining ability, which degrade with the decrease in particle size, can be maintained at a level identical to that attained with pigment particles of a larger size.

The results of the above-described research suggest that a high aspect ratio is preferred, the exception being weatherability of the above-described fourth aspect that does not depend on aspect ratio. However, actually, where the aspect ratio is greatly increased, although the particles are covered with a dispersant and imparted with high dispersion ability, a variety of problems are caused by aggregation thereof. In this regard, the patent documents cited in the background art section of the present description correctly indicate the advantage of spherical pigment particles.

It can be assumed that particles with a large aspect ratio are easier to break physically.

The aspect ratio is dynamically decreased during manufacture, storage, stirring, coating, and printing of ink. In the worst case, it can result in loss with time of specific features of ink that were assumed to be provided by a high aspect ratio when the particles were designed, that is, in the variation and degradation of ink quality with time.

Accordingly, the inventors produced pigments with several types of aspect ratios, produced inks, coated and printed inks, and evaluated the coatings and prints to investigate the optimum aspect ratio.

The results obtained demonstrated that when needle pigment particles with an aspect ratio of at least 3 are selected from among the particles of various shape for dispersing in inks, and the size of the pigment particles is decreased, while the average aspect ratio of the needle pigment particles is at least 5 and at most 7, the performance of the colorant obtained can be improved.

At the same time, it was found that weatherability and remaining ability, which are typically lost with the decrease in particle size, are maintained and that deterioration of dispersion ability of pigment that is a side effect of increased aspect ratio (deterioration of quality, increase in viscosity, and clogging of nozzles caused thereby) can be reduced to a minimum.

The above-described investigation has been conducted based on the assumption that the short diameter of needle pigment particles is uniform.

The remaining ability that is discussed above as the fifth advantage is not significantly affected by the difference in short diameter between individual particles, but the pigment with a large difference in short diameter between individual particles is not suitable from the standpoint of other characteristics.

For example, when the coated or printed surface is formed by an assembly of needle pigment particles with a large difference in short diameter, the particles are not arranged regularly, as shown schematically in FIG. 1 or FIG. 2, the surface is uneven, and the surface flatness is decreased. Furthermore, there are particles that protrude into the gaps of an irregular network formed by the particles and raise in the vertical direction (upward), thereby greatly degrading flatness.

Thus, when pigment particles are to be provided with a needle-like shape, the inventors think it is important to obtain the short diameter such that is necessary to reduce the size of pigment particles and, at the same time, to decrease the spread (standard deviation) in short diameter between the individual particles to below the predetermined value, that is, improve the uniformity of short diameter. Accordingly, these conditions have been investigated.

The results obtained showed that when the short diameter of needle pigment particles is at least 20 nm and at most 30 nm and has a distribution with a standard deviation of 2.0 nm or less, the pigment particles with the above-described average aspect ratio of at least 5 and at most 7 demonstrate the expected performance as a pigment ink composition.

The pigment ink composition in accordance with the present invention comprises pigment particles including at least needle pigment particles, a dispersant, and a solvent.

The pigment particles comprise needle pigment particles with an aspect ratio of at least 3, and examples of particles other than the needle pigment particles include spherical pigment particles with an aspect ratio of less than 3.

The number ratio of the needle pigment particles contained in the pigment particles is equal to or higher than 50%, preferably equal to or higher than 80% based on all the pigment particles.

The needle pigment particles have an aspect ratio of at least 3, preferably at least 4.

The average aspect ratio of the needle pigment particles is at least 5 and at most 7, preferably at least 5.2 and at most 6.7.

The average short diameter of the needle pigment particles is at least 20 nm and at most 30 nm, preferably at least 22 nm and at most 28 nm.

The short diameter desirably has a distribution with a standard deviation equal to or smaller than 2.0 nm, preferably equal to or smaller than 1.5 nm.

Further, it is preferred that the needle pigment particles be covered with a dispersant.

Pigment (Pigment)

Pigments constituting the needle pigment particles and pigment particles other than the needle pigment particles that can be used in accordance with the present invention are not particularly limited, provided that they are colored pigments.

For example, examples of suitable inorganic pigments include natural mineral pigments obtained by grinding minerals and a variety of synthetic inorganic pigments including those stipulated by Japanese Industrial Standards, such as titanium dioxide.

Examples of suitable organic pigments include azo pigments, polycyclic pigments, and lake pigments. Azo pigments demonstrate high weatherability, but polycyclic systems have even higher weatherability and are most often used in inks that require weatherability.

More specific examples of polycyclic pigments that are often used as organic pigments are listed below.

Thus, these examples include quinophthalone, isoindoline, isoindolinone, diketopyrrolopyrrole, perinone, quinacridone, perylene, dioxazine, and phthalocyanine blue or phthalocyanine green containing metal elements. In particular, 2,9-dimethylquinacridone is used in large amounts in a variety of fields as a pigment of magenta color that has high coloring ability and good weatherability.

Methods for manufacturing these pigment particles are not particularly limited, provided that particles of the above-described shape can be obtained.

For example, two synthesis method are employed for industrial manufacture of quinacridone.

However particles obtained by these methods have a large size, aggregate easily, and have a decreased degree of crystallization. As a result, they cannot be used as colorants (particles in this state will be referred to as "crude quinacridone"). Therefore, the crude quinacridone has to be converted into particles of a size enabling the dispersion thereof. There are two methods that can be used to obtain such particles.

The first method is a pigment size reduction method by which crude quinacridone is ground to a necessary particle size by physical grinding such as salt milling or dry milling.

This method is typically used because of cost considerations. Further, this method often includes a step of adding an organic solvent during grinding in order to enhance grinding and also increase the degree of crystallization.

The second method is a pigment size reduction method in which crude quinacridone is dissolved in an organic protonic acid such as methanesulfonic acid and/or an inorganic protonic acid such as sulfuric acid and polyphosphoric acid and then re-precipitated.

With this method the dissolved quinacridone is crystallized, forming particles. Therefore, the particle size can be reduced to a level that is difficult to attain by grinding. Moreover, by employing an adequate crystal growth process, it is possible to produce particles with a high degree of crystallization and uniform shape.

This process of manufacturing pigment particles may be performed simultaneously with the below-described process of covering the particles with a dispersant.

After the particles have been manufactured, the particles of a specific shape may be sorted by using an appropriate method such as ultrafiltration, electrophoresis, or centrifugal separation, to improve the uniformity of particle shape.

The content of needle pigment particles and pigment particles other than the needle pigment particles in the pigment ink composition in accordance with the present invention is at least 0.1 wt. % and at most 15 wt. %, preferably at least 0.5 wt. % and at most 5 wt. %.

Solvent

The solvent is not particularly limited, provided that it is a liquid medium in which pigment is dispersed in a particle shape, without dissolution.

Inks that are called aqueous inks contain water as the main component, and a water-soluble organic solvent is mixed therewith according to the printing method or properties of the printing medium. Any solvent that has been employed with conventional well-known inks can be used for admixing.

Specific examples of suitable solvents include:

alcohols such as methyl alcohol, ethyl alcohol, propyl alcohol, butyl alcohol, and pentanol;

amides such as dimethylformamide and dimethylacetamide;

ketones or ketone alcohols such as acetone and diacetone alcohol;

alkylene glycols in which an alkylene group contains 2-6 carbon atoms, such as ethylene glycol, propylene glycol, trimethylene glycol, butylene glycol, 1,2,6-hexane triol, and hexylene glycol; and lower alkyl ethers of polyhydric alcohols such as thiodiglycol, glycerin, ethylene glycol monomethyl (or ethyl)ether, diethylene glycol monomethyl (or ethyl) ether, and triethylene glycol monomethyl (or ethyl) ether.

The content of the water-soluble organic solvent such as described hereinabove in the pigment ink composition in accordance with the present invention is at least 1 wt. % and at most 49 wt. %, preferably at least 2 wt. % and at most 30 wt. %.

The so-called oily inks contain the following organic solvents as the main component:

hydrocarbons such as n-octane, n-decane, ligroin, naphtha, benzene, toluene, and xylene; and ethers such as dibutyl ether, dihexyl ether, anisole, phenetole, and dibenzyl ether. The above-described organic solvents are mixed according to the printing method or properties of the printing medium.

Dispersant

A dispersant that can be used in accordance with the present invention is not particularly limited, provided that the pigment particles of the above-described shape are dispersed without aggregation in a liquid medium that is the main component of ink. A dispersant that can adhere to the pigment particles and integrate therewith, so that the particles themselves have dispersion ability, is especially preferred. In the case of aqueous inks, the anionic, cationic, nonionic, and amphoteric surfactants can be used as the dispersant.

Surfactants of each group will be illustrated hereinbelow by specific examples. Examples of anionic surfactants are listed below.

Fatty acid salts, alkylsulfonic acid esters and salts, alkylarylsulfonic acid salts, alkyldiarylethersulfonic acid salts, dialkylsulfosuccinic acid salts, alkylphosphates, naphthalenesulfonic acid formalin condensate, polyoxyethylene alkylphosphoric acid esters and salts, and glycerol borate fatty acid esters.

Examples of cationic surfactants are listed below.

Alkylamine salts, quaternary ammonium salts, alkylpyridinium salts, and alkylimidazolium salts.

Examples of nonionic surfactants are listed below.

Polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-containing surfactants, silicon-containing surfactants. Examples of amphoteric surfactants include alkylbetaines, alkylamine oxides, and phosphadylcholines.

With these surfactants, the hydrophobic group portion of the surfactant is attached to the pigment particle, and the hydrophilic group portion is attached to the surface, thereby increasing the affinity for the aqueous solvent that is the main component of the ink. In addition, they prevent the particles from bonding together and aggregating by providing for identical electric charges on the pigment particles and causing mutual repulsion thereof.

Anionic, cationic, nonionic, and amphoteric surfactants have respective merits, and the appropriate surfactant may be determined by taking into account the electric charge of the medium material onto which the ink will be coated or printed and facilitating the formation of electric bonds between the pigment particles and medium during coating or printing.

However, cationic substances are easily bonded to DNA of living organisms that have anionic properties and undeniably can serve as genetic inhibitors or carcinogenic substances. Accordingly, it is preferred that the use of cationic surfactants in inks with a high probability of coming into contact with human body (for example, inks for ink-jet printers or coating materials for home applications) be avoided.

Specific examples of anionic surfactants are listed below.

Sodium salts of fatty acids, potassium salts of fatty acids, sodium salts of alpha fatty acid esters, sodium alkylbenzene sulfonates, sodium dodecyl sulfate (referred to hereinbelow as SDS), sodium salts of alkylsulfuric acid esters, sodium salts of alkylether sulfuric acid esters, alpha olefins, sodium salts of alpha olefin sulfonic acids, and sodium salts of alkylsulfonic acids or the like.

In aqueous solutions, anionic surfactants are ionized producing metal ions, and resultant negative charges provide for mutual repulsion, but as the solvent is absorbed and evaporated after the ink has been coated or printed, recombination with metal ions ensures electric neutralization. Therefore, no repulsion or spread occurs in the ink layer on the coated or printed surface.

When the pigment particles are covered with a dispersant, thereby producing dispersant-covered pigment, the method suitable for manufacturing such pigment is not particularly limited, provided that the above-described particle shape can be produced and/or maintained.

At the above-described stage of manufacturing the pigment particles, a dispersant and/or a dispersant monomer and/or precursor may be added, so that synthesis and/or reprecipitation thereof proceed simultaneously with that of the pigment.

Where a step of further grinding the obtained reprecipitate to reduce the particle size thereof is added, the dispersant and/or the dispersant monomer and/or precursor may be added and attached to the pigment particle surface.

In the case of oily inks, a vinyl copolymer, a cellulose resin, and a polycondensate resin are used.

Specific examples thereof are listed below.

Polymethacrylic acid esters, polyacrylic acid esters, methacrylic acid ester-acrylic acid ester copolymers, poly(vinyl acetate) vinyl chloride-vinyl acetate copolymer, polyvinyl pyrrolidone, ethyl cellulose, methyl cellulose, polyesters, polyamides, and phenolic resins or the like.

(Additives)

Additives may be added according to the method or object of use.

No particular limitation is placed on the additives, and where the printing medium is a fibrous material such as paper or a material that has an ink absorption layer on the surface, a penetrating agent that controls the penetration rate of the ink into the printing medium may be added.

Where the printing means is a nozzle or slit, a nonionic surfactant may be added as an additive to improve wetting of the wall surface of the nozzle or the like.

When an ink-jet printer employs a drive method by which heating and bubbling is induced with a heater located inside the nozzle to eject the ink, an additive imparting the ink with heat resistance may be added.

Examples of other additives that may be added to maintain or improve ink quality include wetting agents such as polyhydric alcohols, glycols, glycol ethers, amides, and pyrrolidones, bonding agents, oxygen absorbers, agents regulating physical properties, charge regulating agents, fungicides, and chelating agents.

An optimum additive may be selected and added according to the below-described method of use, or the composition may contain no additives.

The content ratio of additive in the pigment ink composition in accordance with the present invention is at least 0.5 wt. % and at most 20 wt. %, preferably at least 1 wt. % and at most 15 wt. %.

Mixing with Pigment Particles Manufactured by Physical Grinding

An ink may be produced by using only the pigment particles of a specific shape in accordance with the present invention, but it is also possible to produce an ink by mixing with spherical particles with an aspect ratio of less than 3 and close to 1 that are manufactured by physical grinding, which is the conventional method.

The image quality of the prints obtained with such mixed inks is inferior to that obtained with the ink containing only the pigment particles in accordance with the present invention, but higher than that obtained only with ground particles. Sufficient increase in image quality is observed when the mixing ratio of needle pigment particles to sphere pigment particles is about 25%, and the image quality further rises with the increase in mixing ratio.

The mixing process can be realized by adding a small-scale pigment particle manufacturing unit to the conventional pigment particle manufacturing unit. Therefore, such a method has good cost efficiency and makes it possible to obtain image quality that is higher than that attained with the conventional pigment inks with small initial investment.

Further, such mixing causes no degradation of quality caused by aggregation of particles and increase in ink viscosity due to the presence of particles of various shapes in the ink.

Restating the essence of the present invention, the shape of pigment particles of the pigment ink composition of the present invention is such that an average aspect ratio is at least 5 and at most 7, a short diameter is at least 20 nm and at most 30 nm, and a distribution of short diameter has a standard deviation of 2.0 nm or less, and such particles are covered with a dispersant. As a result, the following three effects can be attained at the same time.

1. High transparency and color performance characteristics such as OD that are not inferior to that of dyes are demonstrated.

2. Weatherability and remaining ability are maintained.

3. Degradation of dispersion ability of the pigment (deterioration of quality, increase in viscosity, and clogging of nozzles caused thereby) is minimized.

In addition, image quality can be improved even when the pigment particles are mixed with pigment particles manufactured by grinding.

EXAMPLES

The present invention will be described below in greater detail with reference to specific examples thereof. However, the present invention is not limited to these examples.

Example 1

In the present example, pigment particles with an average aspect ratio of 6.6 were manufactured, evaluated, and used for ink-jet printing and dispenser coating.

Figure 3:
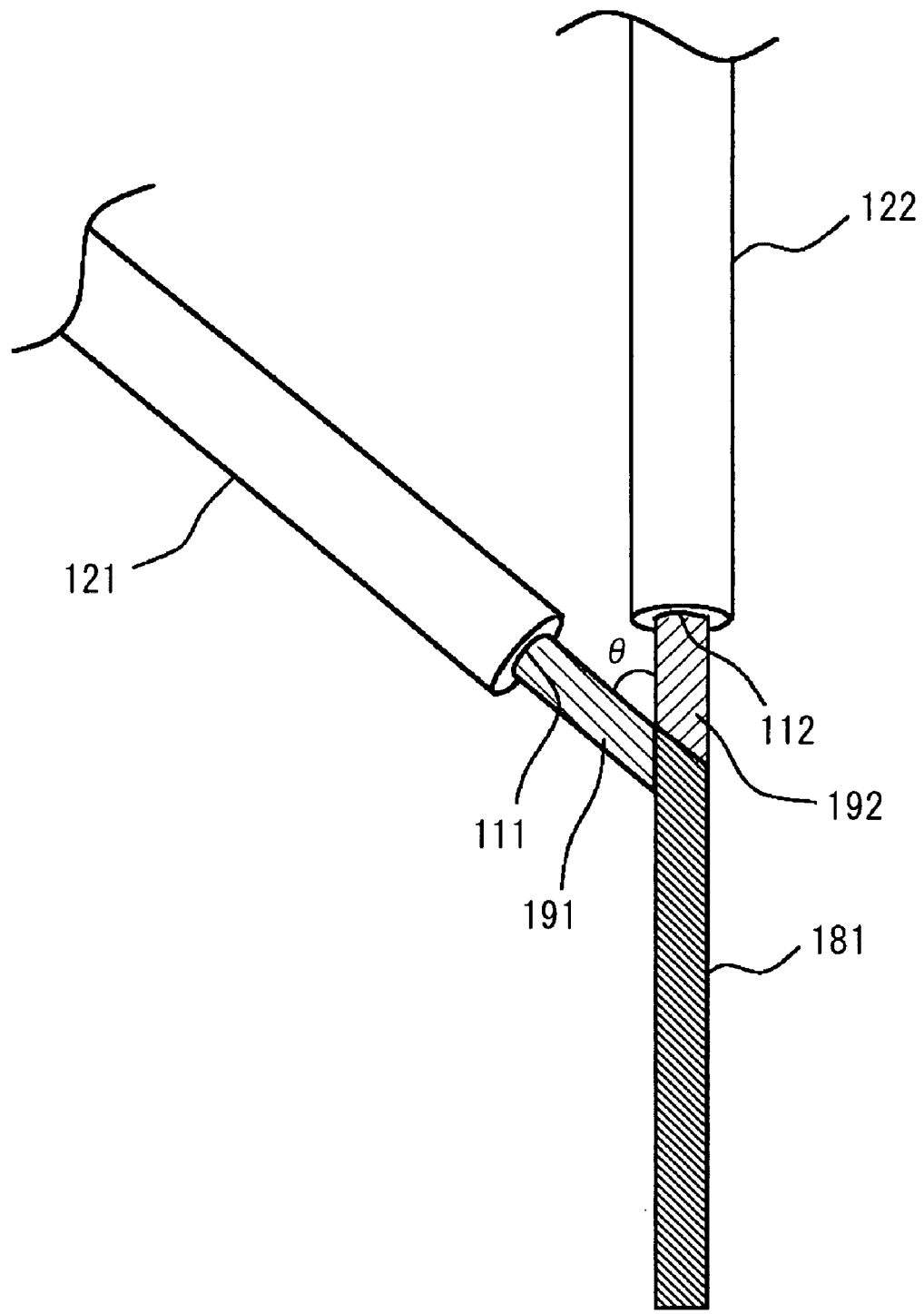
FIG. 3 is a schematic drawing of an apparatus used in the manufacture of pigment particles in accordance with the present invention.

A liquid mixing apparatus shown in FIG. 3 was used for producing the composition. A nozzle 121 for ejecting one liquid was made from Teflon® and had an opening 111 with a diameter of 300 μmϕ. A nozzle 122 for ejecting another liquid was made from glass and had an opening 112 with a diameter of 470 μmϕ. The angle θ formed by the propagation directions of the two liquids was 40 degrees.

The liquid 191 for ejection from the nozzle 121 was prepared in the manner as follows: 100 g of dimethyl sulfoxide was added to 1.0 g of 2,9-dimethylquinacridone pigment C. I. Pigment Red 122 and a suspension was obtained.

Then, 1.5 g of sodium dodecyl sulfate was added as a dispersant, 8 mL of a 25% aqueous solution of potassium hydroxide was added, and the components were dissolved to prepare a reaction liquid. Ion-exchange water was used as the liquid 192 for ejection from the nozzle 122.

A syringe pump was used to supply the liquids, and the two liquids were supplied to the nozzles 121 and 122. The liquid 191 for ejection from the nozzle 121 was supplied by the syringe pump at a flow rate of 6 mL/min and the liquid 192 for ejection from the nozzle 122 was supplied at a flow rate of 12 mL/min.

The two liquids ejected from the nozzles came into contact with each other on the extension lines in the propagation directions thereof, a reprecipitation reaction and dispersion were instantaneously initiated, and a liquid 181 having quinacridone pigment particles dispersed therein (described hereinbelow as "dispersion") was obtained.

The dispersion 181 was diluted and electrophoretic measurements were conducted using a zeta potential analyzer (ZEECOM, manufactured by Microtec Nition Co.). The measurements confirmed that the particles moved to the plus electrode and that the particles were anion particles. The mobility of 20 particles was measured and averaged.

Because the pigment particles themselves carry no electric charge and also because the sodium dodecyl sulfate is ionized in aqueous solutions and ions of dodecylsulfuric acid carry a negative charge, the resultant particles were confirmed to have a coating of sodium dodecyl sulfate serving as a dispersant on the surface of pigment particles.

The dispersion 181 was dried to obtain a powder and 2θ thereof was measured from 5 degrees to 30 degrees, by using an X-ray analyzer (X'PertPRO, the target of X-ray source was copper; manufactured by PANalytical Co., Ltd.). The results obtained demonstrated that the first peak 2θ=5.3 degrees (about 1.7 nm) was identical to that of typical α-quinacridone crystals, thereby confirming that the produced pigment particles were quinacridone crystals.

Further, a mesh substrate was immersed in the dispersion, the dispersion film formed at the mesh was frozen with liquid nitrogen, and a portion with amorphous ice in which the dispersion itself was instantaneously frozen and solidified was observed under a transmission electron microscope (TEM, TecnaiF20XT, manufactured by Hitachi, Ltd.).

Figure 4:
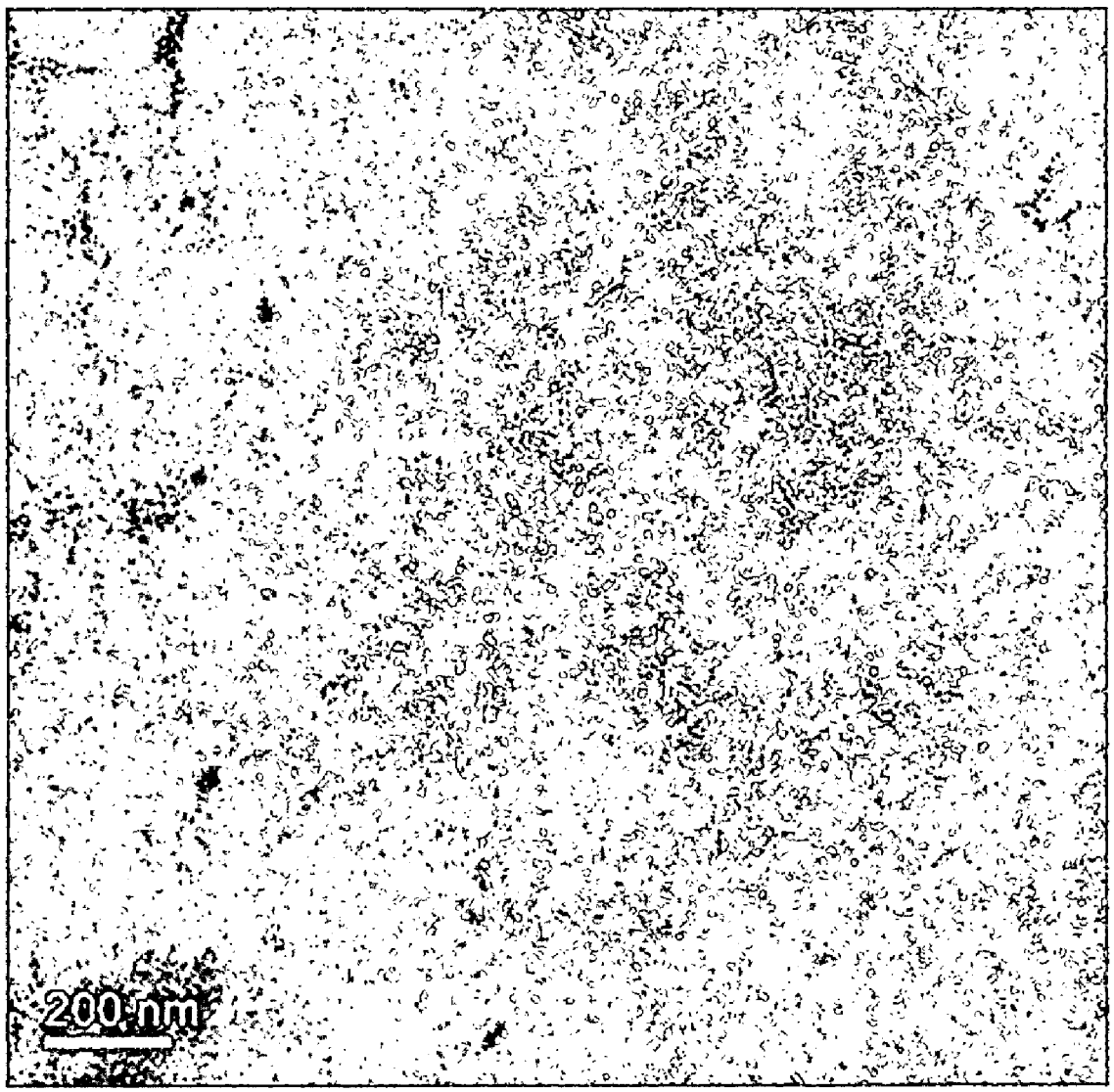
FIG. 4 is a TEM photograph obtained by observing the frozen pigment ink composition of Example 1 of the present invention.

The results demonstrated that spherical particles and needle particles were present independently without aggregation. The transmission electron micrograph is shown in FIG. 4.

The particles in the image that seem to be spherical and those that seem to be needle shaped were counted and almost equal numbers were obtained.

In this measurement method, the thickness of dispersion film (depth direction of the image) appears to be larger than the length of the needle pigment particles (long diameter). Therefore, the needle pigment particles can rotate freely. As a result, when observations are preformed with a photograph that has been picked up two dimensionally, it is possible that the long diameter of needle pigment particles will appear shorter than the actual long diameter and that the particles that happened to become perpendicular to the image plane will be viewed as apparently spherical particles. Accordingly, it is obviously possible that some of the pigment particles that appear to be spherical in the image are actually needle pigment particles, and it can be said that the number ratio of needle-shaped particles floating in the dispersion is equal to or more than 50%.

The dispersion was diluted, dried on a colloidal membrane mesh, and observed under a transmission electron microscope. The individual needle pigment particles were observed in a state in which a grid pattern with a period of about 1.7 nm extended, without interruption, parallel to the longitudinal direction.

The results are shown in FIG. 5. FIG. 5B is an enlarged view of part of FIG. 5A.

This 1.7 nm grid pattern matched an about 1.7 nm peak observed in X-ray diffraction, and the particles were confirmed to be quinacridone particles.

Because the grid pattern extended over all the particles, without interruption or change in angle, individual particles were confirmed to be single crystals.

The pigment particles contained in the dispersion were then dispersed over a mica substrate and observed under an atomic force microscope (AFM, Nanoscope IIIa, resolution of probe tip is 10 nm or less; manufactured by Veeco Co.). Spherical particles and needle pigment particles identical to those viewed under TEM were observed.

Figure 6:
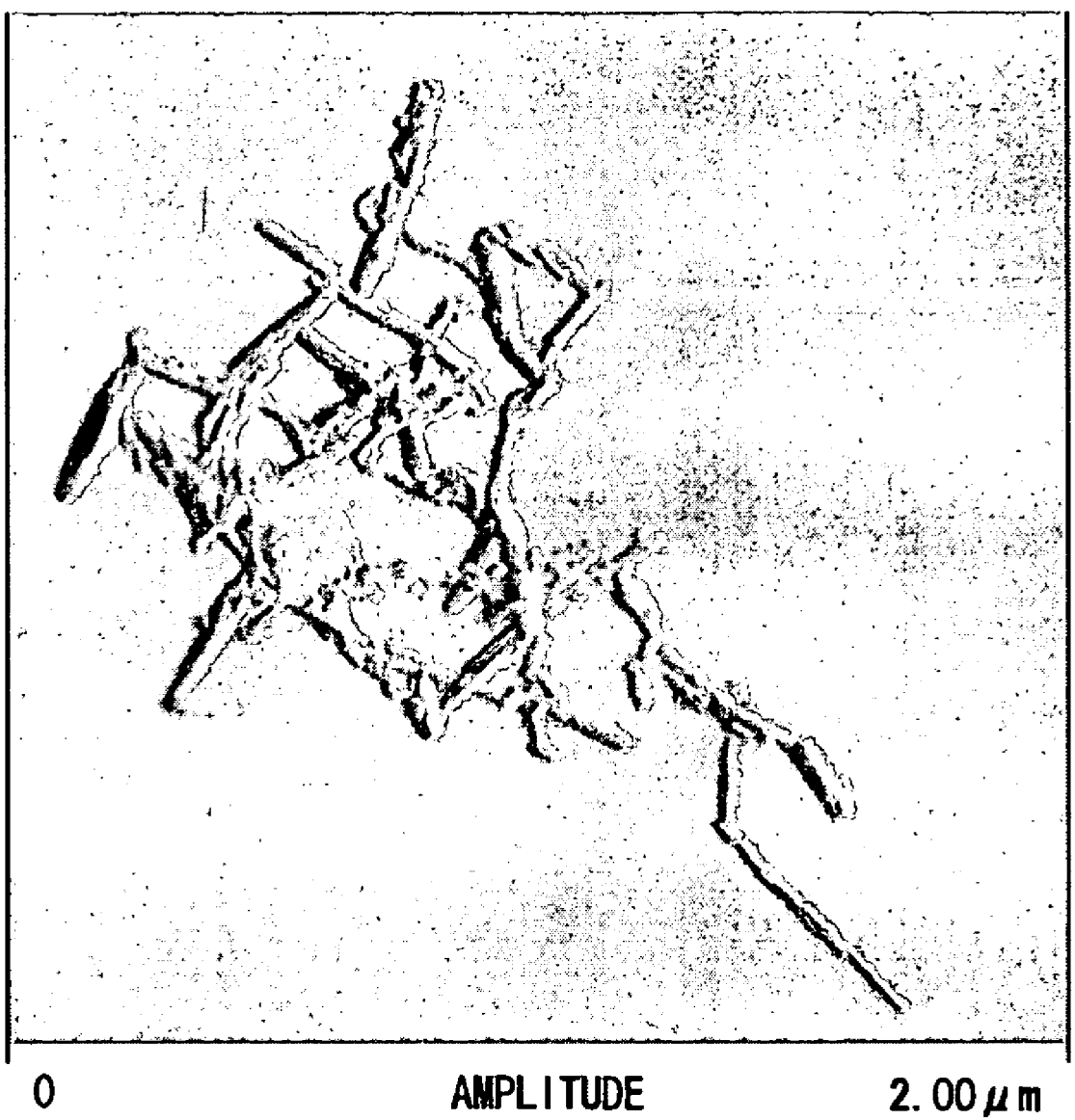
FIG. 6 is a TEM photograph obtained by observing the pigment particles of Example 1 of the present invention.

The image obtained is shown in FIG. 6.

Several such AFM images were picked up and the long diameter (length) of particles for which independent individual particle shape could be recognized was measured.

The results obtained demonstrated that the particles could be divided into a group of spherical particles with a diameter equal to or less than 30 nm and a group of needle particles with a long diameter equal to or larger than 80 nm and equal to or smaller than 240 nm, and no particles with a long diameter larger than 30 nm or smaller than 80 nm were present. Of these two groups, about 50 needle particles were selected and average values of long diameter and short diameter (thickness) thereof were calculated. The long diameter was found to be about 165 nm and have a normal distribution with a standard deviation of about 32 nm, whereas the short diameter was found to be about 25 nm and extremely uniform with a standard deviation of about 1.1 nm.

These results demonstrated that of the particles produced, the needle particles had a certain distribution of long diameters, but the short diameter had almost the same length (thickness) in all the particles and the average aspect ratio of the particles was 6.6.

The dispersion was then subjected to ultrafiltration, excess sodium dodecyl sulfate, dimethyl sulfoxide, and potassium hydroxide dissolved in the liquid, and also water, were removed, and the concentration of pigment particles was increased. A polyhydric alcohol was then added to obtain a pigment ink for ink-jet printing.

The pigment ink was a semitransparent solution of magenta color.

Figure 7:
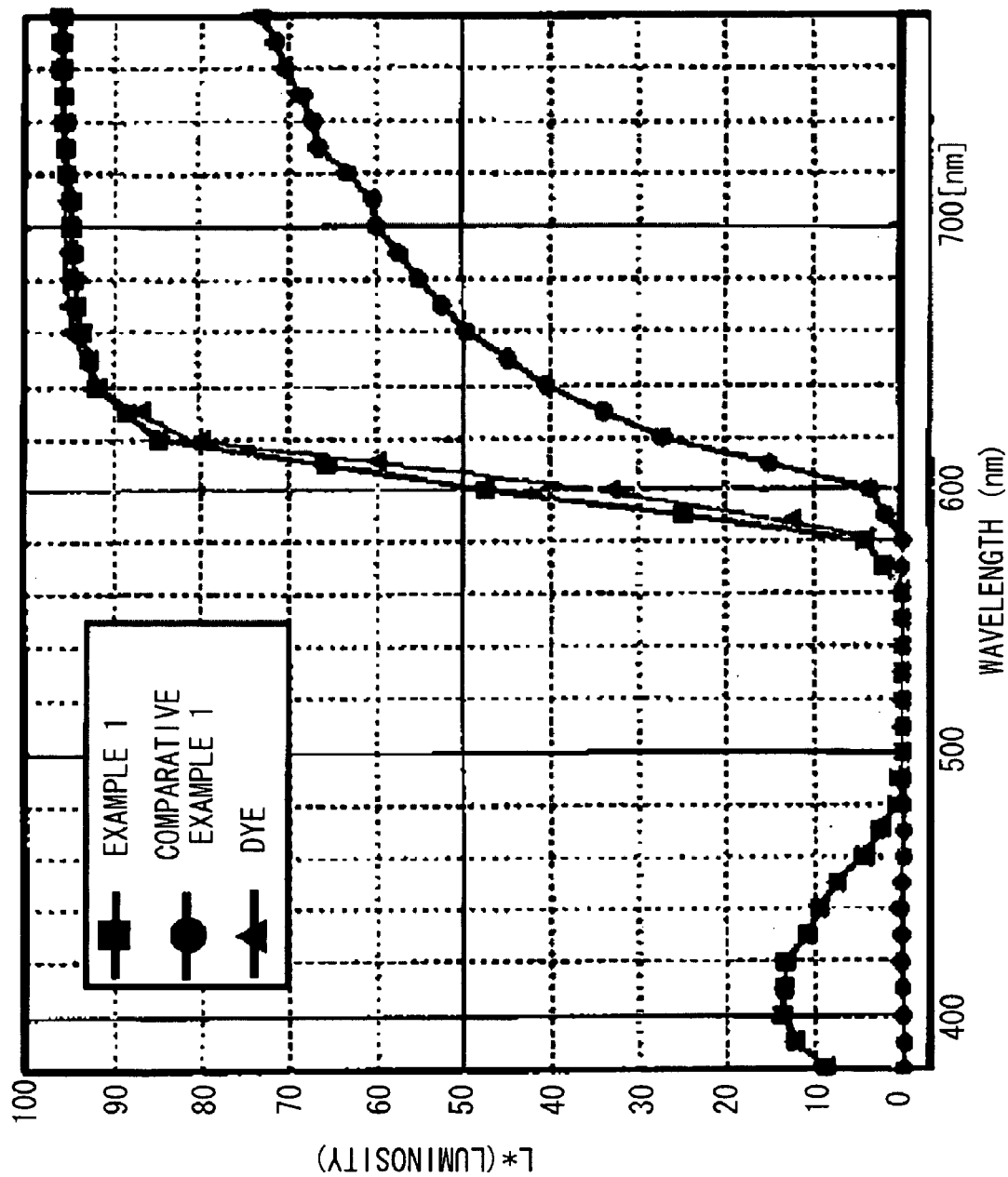
FIG. 7 shows absorption spectra of the ink of Example 1 of the present invention, dye ink, and ink of Comparative Example 1.

The absorption spectrum of the ink was measured with a spectral calorimeter (SQ2000, manufactured by Nippon Denshoku KK). As shown in FIG. 7, the profile of the ink produced in the present example matched well the profile of a magenta dye ink.

The pigment ink was placed in a transparent glass container, sealed therein, and allowed to stay for about 10 weeks at room temperature in a test room irradiated with a fluorescent lamp. No precipitation was observed.

The absorption spectrum was then measured, and practically no changes caused by the irradiation were observed.

The ink was then diluted, dispersed over a mica substrate, and observed under an AFM. Needle pigment particles identical to those immediately after the dispersion was produced were observed.

These results confirmed that the pigment particles contained in the ink maintained its dispersion ability and the ink was stable even after long-term storage.

The ink was loaded in an ink cartridge for an ink-jet printer manufactured by Canon Inc., the cartridge was installed in the ink-jet printer (PIXUS950, manufactured by Canon Inc.), and printing was performed over the entire surface of ink-jet printing paper of photographic quality (Prophoto Paper PR-101, manufactured by Canon Inc., referred to hereinbelow as glossy paper).

The ink was dried and the OD according to JIS Z8741 was measured with an OD meter (Gretag Macbeth RD-19, manufactured by Sakata Inks KK).

The results showed that OD was about 3.1.

Figure 8:
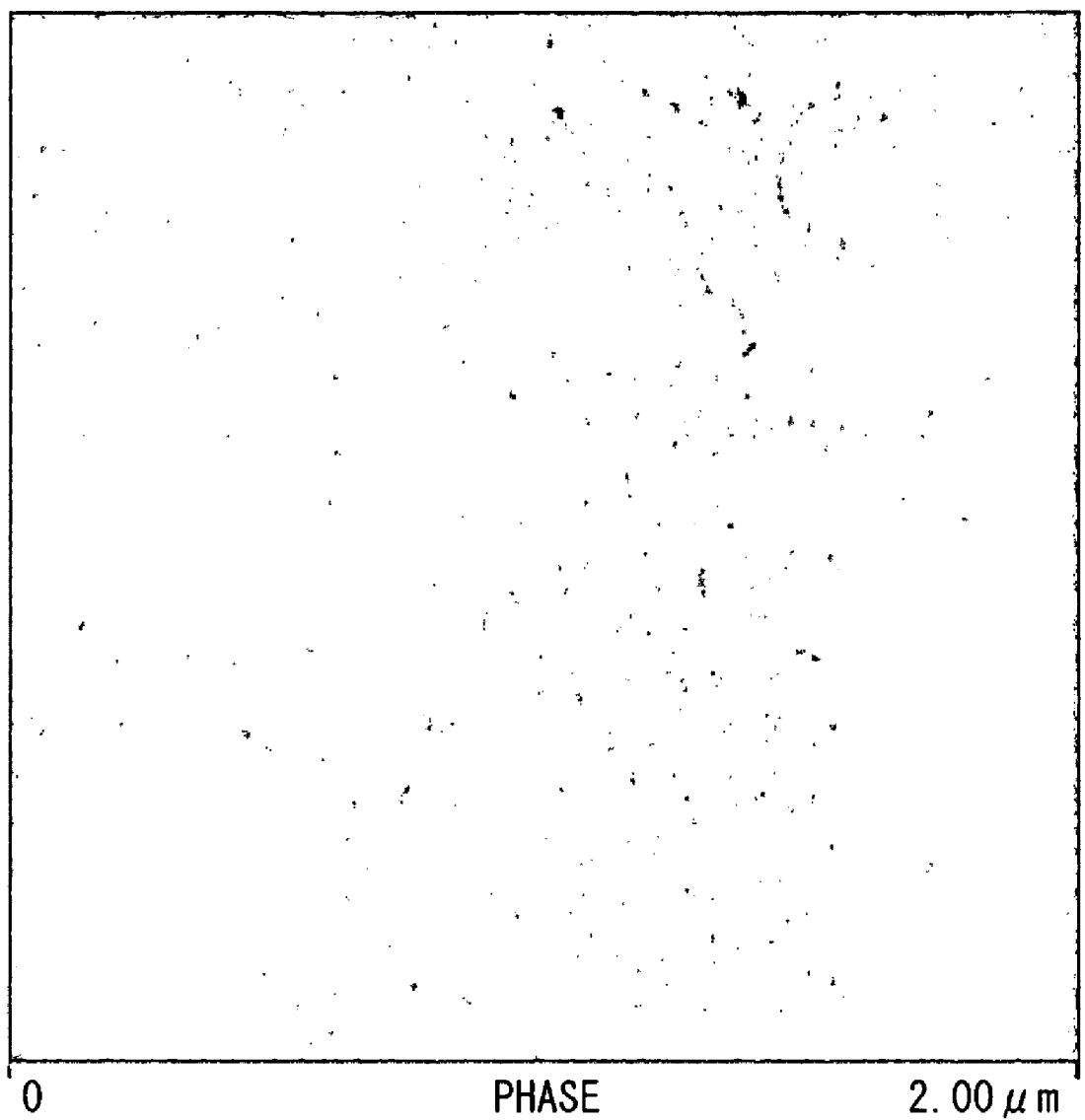
FIG. 8 is an AFM photograph obtained by printing the pigment ink composition of Example 1 of the present invention as an ink with the ink-jet printer and observing the ink surface.

The printed surface was observed under an AFM. The needle pigment particles were observed to be regularly and orderly arranged as shown in FIG. 8. Several images were taken and the average surface roughness was calculated. The result was 5.1 nm. The average surface roughness of the ink absorption layer of the glossy paper on which no printing was performed was 11.5 nm. Therefore, the outermost surface of the ink layer was flatter than the ink absorption layer of the glossy paper surface. The average surface roughness was calculated by Equation (1) based on the AFM images.

$$R_a = \frac{1}{n}\sum_{j=1}^{n} |Z_j| \quad (1)$$

In Equation (1), $R_a$ stands for an average surface roughness, n—the number of the measurement point within the measurement area, $Z_j$—the height in the measurement point j.

A total of about 20 similar prints were produced, but no degradation of printing quality that could be attributed to nozzle clogging or the like was observed.

The prints were subjected to a light resistance test by irradiating for 100 h with a xenon lamp light with a luminance of 0.39 w/cm$^2$ and a wavelength of 340 nm under an environment with 63° C., 50% (relative humidity). The decrease of 7.5% was observed. This value indicates a certain discoloration caused by the xenon lamp light, but such light resistance still can be considered sufficient for practical use.

The pigment ink was similarly printed over the entire surface of usual paper (Office Planner, manufactured by Canon Inc.). The OD was 1.1. The printed surface was observed under a three-dimensional microscope. A large number of fragments apparently of cell tissue of a plant with a diameter of from several tens to a hundred microns were present on the sheet surface, but the pigment uniformly adhered to nearly the entire surface even in the zones with the fragments.

The pigment ink was also used as a coating material and coated on the entire surface of glossy paper by using an automatic dispenser robot (Economy & Ecology Dispenser, manufactured by Threebond Co., Ltd.; the main part is Desktop Robot JR2000 manufactured by Janome Sewing Machine Co., Ltd.) in which a Teflon® slit was attached to the coating nozzle.

After the ink had dried, gloss and OD were measured in the same manner as in the case of printing with the ink-jet printer. The results obtained were similar to those obtained by printing with the ink-jet printer.

Figure 9:
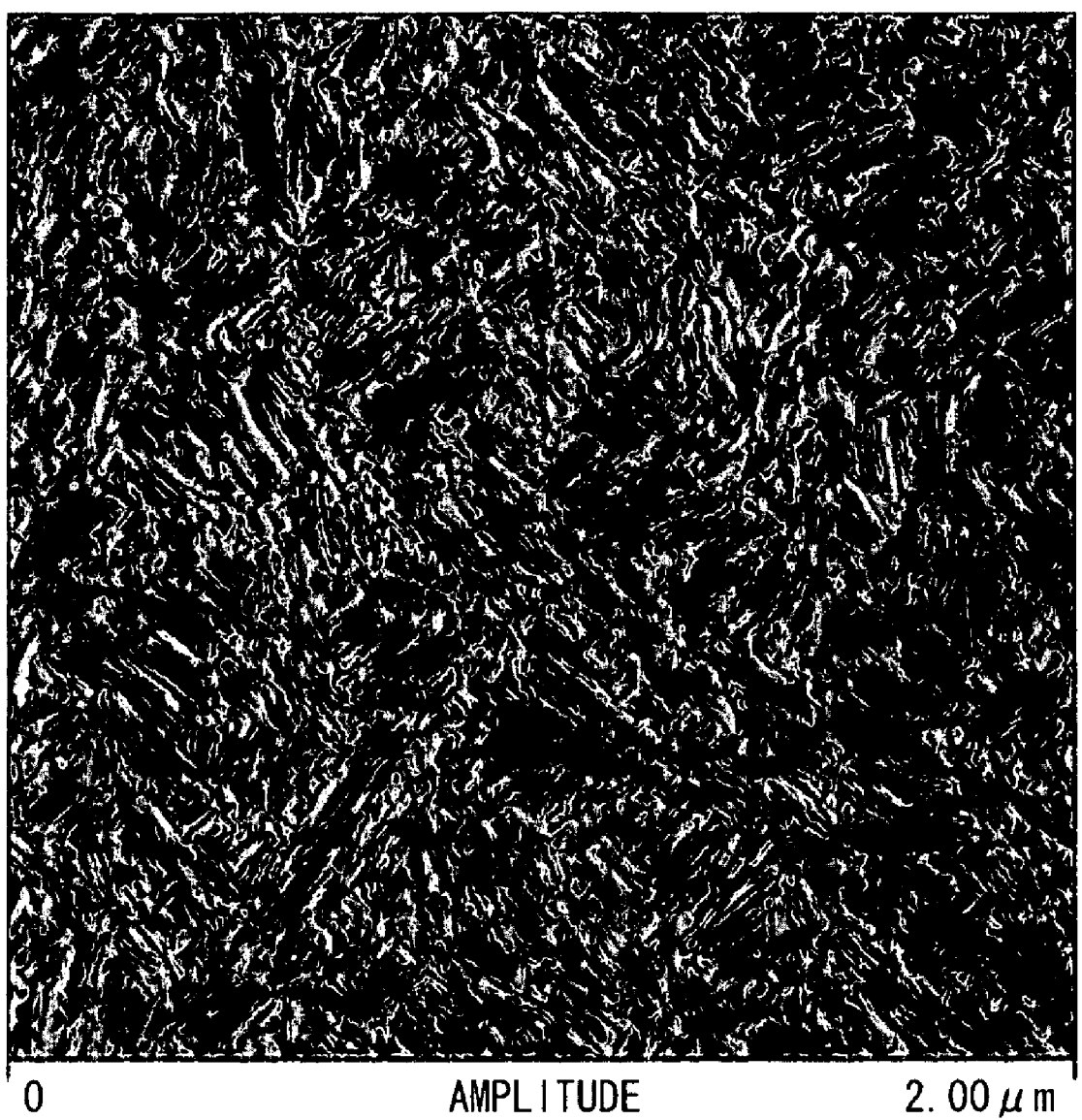
FIG. 9 is an AFM photograph obtained by coating the pigment ink composition of Example 1 of the present invention as an ink with a dispenser and observing the ink surface.

The AFM observations demonstrated a regular orderly arrangement of needle pigment particles, such as shown in FIG. 9.

Comparative Example 1

A dispersion containing particles of 2,9-dimethylquinacridone pigment (C. I. Pigment Red 122) manufactured by grinding was prepared and evaluated by the same methods as in Example 1.

When a frozen sample was observed under a TEM, it was found that several primary particles having a rugby ball shape were aggregated and secondary particles with a diameter of about 100 nm were formed.

When a dried sample was observed under a TEM, some of the particles formed a grid pattern with a period of about 1.7 nm. Several such TEM images were taken in order to measure the long diameter (length) and short diameter (thickness) of particles for which independent individual particle shape could be recognized. The average long diameter was about 60 nm and standard deviation thereof was 13 nm, the short diameter was about 27 nm and standard deviation thereof was 5.1 nm. The average aspect ratio was 2.2.

The dispersion was then used in the same manner as in Example 1 to prepare a pigment ink for an ink-jet printer which had a pigment concentration identical to that of Example 1. The absorption spectrum of the ink was measured by spectral colorimetry in the same manner as in Example 1. As shown in FIG. 7, the results demonstrated a profile with a poor rise that was different from that of the ink of Example 1 or magenta dye ink.

The pigment ink was printed with an ink-jet printer on the entire surface of glossy paper in the same manner as in Example 1 and the print was evaluated. The OD was 2.4. Several AFM images of the ink layer surface were taken and the average surface roughness was calculated in the same manner as in Example 1. The result was 12.3 nm. This average surface roughness was not significantly different from the average surface roughness of the glossy paper surface.

When printing was similarly performed on the usual paper, the OD was 0.86. The printed surface was observed under a three-dimensional microscope. A large number of fragments apparently of cell tissue of a plant with a diameter of from several tens to a hundred microns were present on the paper surface, a sufficient amount of pigment did not adhere to these portions, and the color thereof was thin.

Example 2

In the present example, pigment particles with an average aspect ratio of 5.3 were manufactured, evaluated, and used for ink-jet printing.

A liquid having 2,9-dimethylquinacridone pigment particles dispersed therein was obtained using a liquid mixing apparatus identical to that of Example 1.

In this case, the components were used in the following amounts: quinacridone pigment 1.0 g, dimethyl sulfoxide 100 g, sodium dodecyl sulfate 3.0 g, and 25% aqueous solution of potassium hydroxide 8 mL. The flow rate of the liquid 191 discharged from the nozzle 121 was 6 mL/min, and the flow rate of the liquid 192 discharged from the nozzle 122 was 14 mL/min.

The two liquids discharged from the nozzles were brought into contact with each other in the same manner as in Example 1 and a dispersion 181 of 2,9-dimethylquinacridone pigment particles was obtained.

The dispersion was subjected to electrophoresis in the same manner as in Example 1, and the particles were confirmed to be anion particles.

The dispersion was X-ray analyzed in the same manner as in Example 1. Peaks identical to those of Example 1, including a peak at about 1.7 nm, were obtained.

TEM observations were performed in the same manner as in Example 1. Similarly to Example 1, the individual needle pigment particles were observed in a state in which a grid pattern with a period of about 1.7 nm extended, without interruption, parallel to the longitudinal direction. The individual particles were thus confirmed to be needle-shaped single crystals.

AFM observations were performed in the same manner as in Example 1, and the long diameter (length) and short diameter (thickness) of particles for which independent individual particle shape could be recognized were measured. The average long diameter was about 131 nm and standard deviation thereof was 33 nm, the short diameter was about 25 nm and standard deviation thereof was 1.1 nm. The average aspect ratio was 5.3.

The dispersion was then used in the same manner as in Example 1 to prepare a pigment ink for an ink-jet printer which had a pigment concentration identical to that of Example 1.

The pigment ink was allowed to stay in a test room under irradiation with a fluorescent lamp light at room temperature for about 10 weeks in the same manner as in Example 1, but no precipitation was observed.

The absorption spectrum of the ink was measured with a spectral calorimeter, but the exposure was found to cause practically no changes in the absorption spectrum. Further, a sample obtained by dispersing the ink in the same manner as in Example 1 was observed under an AFM. The observed needle pigment particles were identical to those immediately after the ink was prepared.

These results confirmed that the pigment particles in the ink maintained dispersing ability even after long-term storage and the ink was stable.

The ink was printed with an ink-jet printer on the entire surface of glossy paper in the same manner as in Example 1 and the print was evaluated. The OD was 3.0.

Several AFM images of the ink layer surface were taken in the same manner as in Example 1 and the average surface roughness was calculated. The result was 6.2 nm. Therefore, the outermost surface of the ink layer was flatter than the glossy paper surface.

About 20 similar prints in total were produced, but no degradation of printing quality that could be attributed to nozzle clogging or the like was observed.

The ink was also printed in a similar manner on the entire surface of usual paper. The OD was 1.0. The printed surface was observed under a three-dimensional microscope. The pigment was found to adhere uniformly to almost the entire surface, as in Example 1.

Comparative Example 2

In the present example, pigment particles with an average aspect ratio of 7.6 were manufactured, evaluated, and used for ink-jet printing.

A liquid having 2,9-dimethylquinacridone pigment particles dispersed therein was obtained using a liquid mixing apparatus identical to that of Example 1.

In this case, the components were used in the following amounts: quinacridone pigment 1.0 g, dimethyl sulfoxide 100 g, sodium dodecyl sulfate 1.5 g, and 25% aqueous solution of potassium hydroxide 8 mL. The flow rate of the liquid 191 discharged from the nozzle 121 was 6 mL/min, and the flow rate of the liquid 192 discharged from the nozzle 122 was 10 mL/min.

The two liquids discharged from the nozzles were brought into contact with each other in the same manner as in Example 1 and a dispersion 181 of quinacridone pigment particles was obtained.

AFM observations of particles in the dispersion were performed in the same manner as in Example 1, and the long diameter (length) and short diameter (thickness) of particles for which independent individual particle shape could be recognized were measured. The average long diameter was about 201 nm and standard deviation thereof was 35 nm, the short diameter was about 26 nm and standard deviation thereof was 1.1 nm. The average aspect ratio was 7.6.

The dispersion was then used in the same manner as in Example 1 to prepare a pigment ink for an ink-jet printer which had a pigment concentration identical to that of Example 1. The pigment ink was allowed to stay in a test room under irradiation with a fluorescent lamp light at room temperature in the same manner as in Example 1, precipitation was observed in about 4 weeks.

Figure 10:
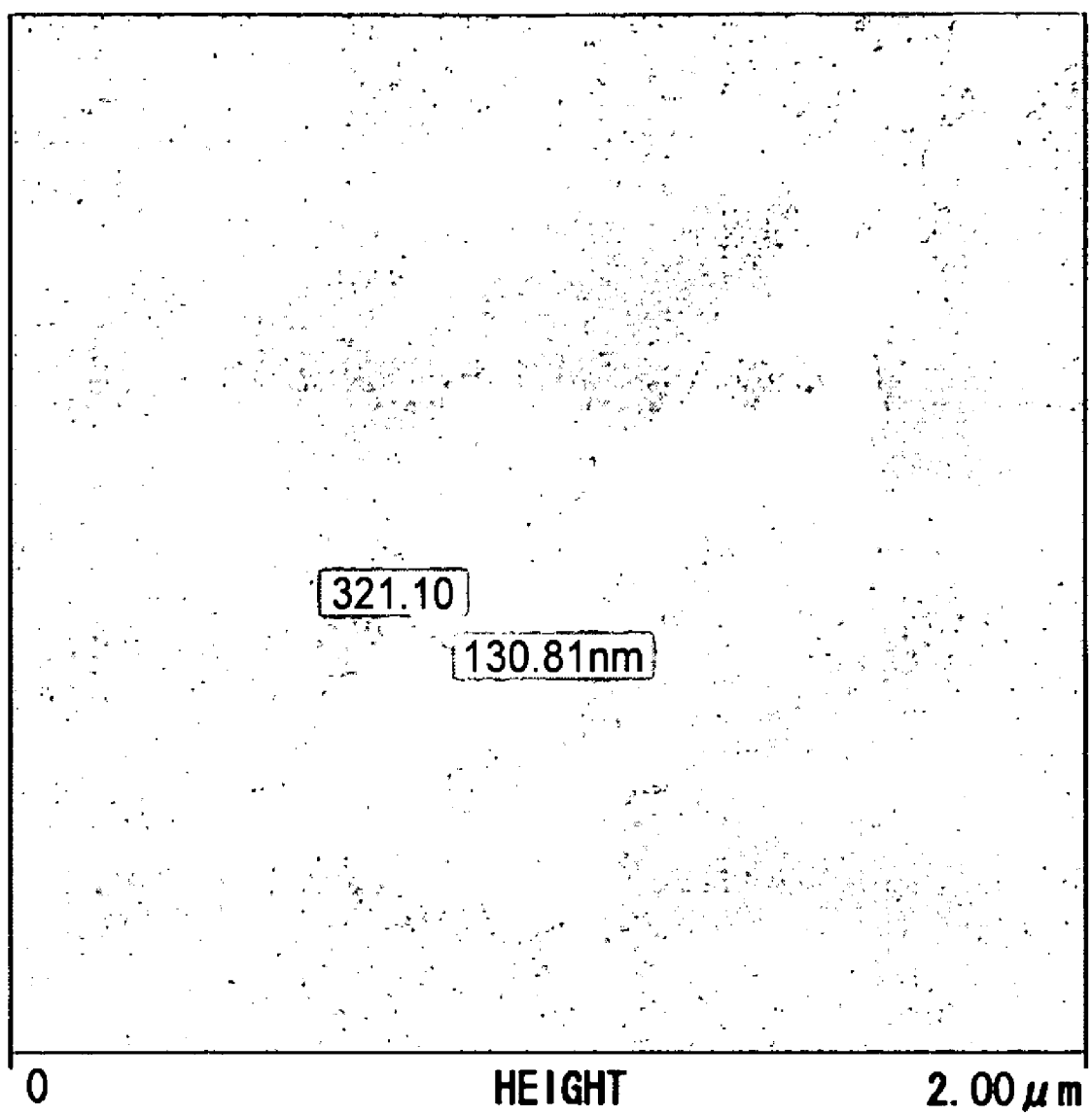
FIG. 10 is an AFM photograph obtained in observing the pigment particles of the pigment dispersion of Comparative Example 2.

The precipitate was diluted, dispersed over a mica substrate, and observed under an AFM. As shown in FIG. 10, a state was assumed in which needle pigment particles or spherical pigment particles aggregated.

Because of the aggregated state, accurate measurements were impossible, but it was clear that the aspect ratio of needle pigment particles decreased from a value of 7.6 that was observed immediately after the particles were prepared. These results indicated that the pigment particles did not maintain dispersion ability and quality of the ink was degraded.

The as-prepared ink was printed with an ink-jet printer on the entire surface of glossy paper in the same manner as in Example 1 and the print was evaluated. The OD was 3.1.

After about 10 prints were made, some of the nozzles were clogged, a linear unprinted portion appeared on the printing surface, and correct printing could not be performed.

Several AFM images of the ink layer surface were picked up in the same manner as in Example 1 and the average surface roughness was calculated. The result was 7.6 nm. Therefore, the outermost surface of the ink layer was flatter than the glossy paper surface.

Properties of the above-described particles of four kinds and inks using same are shown in Table 1 below.

TABLE 1

|  | Comparative Example 1 | Example 2 | Example 1 | Comparative Example 2 |
|---|---|---|---|---|
| Aspect ratio of particles | 2.2 | 5.3 | 6.6 | 7.6 |
| Average long diameter (nm) | 61 | 131 | 165 | 201 |
| Average short diameter (nm) | 27 | 25 | 25 | 26 |
| Standard deviation of short diameter (nm) | 5.1 | 1.1 | 1.1 | 1.1 |
| Are pigment particles single crystals? | Not clear | Yes | Yes | — |
| Ink viscosity (CPS) | 2.9 | 5.2 | 3.9 | — |
| Light resistance (ΔE) | 2.8 | — | 7.5 | — |
| Presence of aggregates | No | No | No | Yes |
| Nozzle clogging | No | No | No | Yes |
| Glossy paper OD | 2.4 | 3.0 | 3.1 | 3.1 |
| Glossy paper, average surface roughness (nm) | 12.3 | 6.2 | 5.1 | 7.6 |
| Usual paper OD | 0.86 | 1.0 | 1.1 | — |

Example 3

In the present example, particles with an average aspect ratio of 6.6 were produced and mixed with pigment particles manufactured by the conventional grinding method to obtain an ink that was ink-jet printed on the usual paper.

A liquid having dispersed therein quinacridone pigment particles identical to those of Example 1 (referred to hereinbelow as "dispersion") was obtained using the apparatus identical to that of Example 1.

A pigment ink for an ink-jet printer that had a pigment concentration identical to that of Example 1 was obtained by the same method as was used in Example 1. For the sake of convenience, this ink will be referred to as ink A. An ink was also prepared by using pigment particles manufactured by performing grinding in the same manner as in Comparative Example 1. This ink will be referred to as ink B.

Absorption spectra of the inks A, B were measured, pigment concentrations of the two inks were confirmed to be almost equal, and mixed inks of three kinds were obtained by mixing the ink A and ink B at ratios A:B=1:3, 2:2, 3:1.

These mixed inks demonstrated neither aggregation nor precipitation immediately after mixing.

The mixed inks were then allowed to stay for about 10 weeks at room temperature in a test room under fluorescent lamp irradiation in the same manner as in Example 1. No precipitation was observed, thereby confirming that mixing caused neither short-term nor long-term degradation of quality and that the mixed inks had good stability.

The mixed inks were printed on the entire surface of usual paper with an ink-jet printer in the same manner as in Example 1. The OD of the mixed inks with the content ratio of 1:3, 2:2, 3:1 was 0.92, 0.96, and 1.02, respectively.

Thus, although the OD of mixed inks degraded with respect to 1.10 of Example 1 in which the content ratio of ink A was 100%, it was increased over 0.86 of Comparative Example 1 in which the content ratio of ink B was 100%.

FIG. 11 shows the OD of Example 1 (mixing ratio of ink A and ink B is 0:4), the present example (mixing ratio of ink A and ink B is 1:3, 2:2, 3:1), and Comparative Example 1 (mixing ratio of ink A and ink B is 4:0).

In other words, where inks were produced by mixing the needle pigment particles of the present invention with the conventional pigment particles produced by grinding, it was found that substantial increase in OD was observed when the weight ratio of the needle pigment particles in the entire pigment was at least 25%, and the OD further increased with the increase in mixing ratio.

The same printing cycle was repeated about 20 times, but no degradation of printing quality that can be attributed to nozzle clogging or the like was observed.

By using the pigment ink composition in accordance with the present invention, it is possible to increase the transparency of liquid ink, obtain high OD of coatings and prints, and demonstrate high color performance on par with the dyes. In addition, it is possible to maintain weatherability and remaining ability and minimize degradation of quality, increase in viscosity, and nozzle clogging that are caused by degradation of dispersion ability of the pigment.

Therefore, the pigment ink composition in accordance with the present invention can be used for inks for ink-jet printers and for coating materials.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-193704, filed Jul. 25, 2007, which is hereby incorporated by reference herein in its entirety.

What is claimed is:

1. A pigment ink composition comprising:
   pigment particles including needle pigment particles;
   a dispersant; and
   a solvent,
   wherein the needle pigment particles have a needle shape with an aspect ratio of at least 3, an average aspect ratio of at least 5 and at most 7,
   wherein the needle pigment particles have an average short dimension of at least 20 nm and at most 30 nm, and a distribution of short dimension with a standard deviation of 2.0 nm or less,
   wherein the needle pigment particles are covered with the dispersant, and
   wherein the needle pigment particles are composed of single crystals.

2. The pigment ink composition according to claim 1, wherein at least 50% of the pigment particles by number are needle pigment particles.

3. The pigment ink composition according to claim 1, wherein the needle pigment particles are comprised of a polycyclic organic pigment.

4. The pigment ink composition according to claim 3, wherein the polycyclic organic pigment is a quinacridone compound.

5. The pigment ink composition according to claim 1, wherein the dispersant that covers the needle pigment particles is a surfactant having polarity.

6. The pigment ink composition according to claim 1, wherein the solvent is a water-soluble organic solvent.

7. An ink for an ink-jet printer, comprising the pigment ink composition according to claim 1.

8. A coating material comprising the pigment ink composition according to claim 1.

9. A pigment ink composition comprising;
a dispersant;
a solvent; and
needle pigment particles obtained by reprecipitation from a solution in which a pigment has been dissolved,
wherein the needle pigment particles have a needle shape with an aspect ratio of at least 3, an average aspect ratio of at least 5 and at most 7,
wherein the needle pigment particles have an average short dimension of at least 20 nm and at most 30 nm, and a distribution of short dimension with a standard deviation of 2.0 nm or less,
wherein the needle pigment particles are covered with the dispersant, and
wherein the needle pigment particles are composed of single crystals.

10. The pigment ink composition according to claim 9, further comprising pigment particles obtained by physical grinding, wherein the ground pigment particles are mixed with the needle pigment particles.

11. A method of forming a pigment ink composition, comprising the steps of:
obtaining needle pigment particles by reprecipitation from a solution in which a pigment has been dissolved; and
combining the needle pigment particles with a solvent and a dispersant,
wherein the needle pigment particles have a needle shape with an aspect ratio of at least 3, an average aspect ratio of at least 5 and at most 7, wherein the needle pigment particles have an average short dimension of at least 20 nm and at most 30 nm,
wherein the needle pigment particles have a distribution of short dimension with a standard deviation of 2.0 nm or less,
wherein the needle pigment particles are covered with the dispersant, and
wherein the needle pigment particles are composed of single crystals.

12. The method according to claim 11, further comprising the steps of:
obtaining pigment particles by physical grinding; and
mixing the ground pigment particles with the needle pigment particles.

* * * * *